(12) United States Patent
Sulatisky et al.

(10) Patent No.: US 6,687,597 B2
(45) Date of Patent: Feb. 3, 2004

(54) NEURAL CONTROL SYSTEM AND METHOD FOR ALTERNATIVELY FUELED ENGINES

(75) Inventors: Michael Theodore Sulatisky, Saskatoon (CA); Sheldon George Hill, Saskatoon (CA); Yimin Song, Saskatoon (CA); Kimberley Allan Young, Saskatoon (CA); Gnanaprakash Gnanam, Saskatoon (CA)

(73) Assignee: Saskatchewan Research Council, Saskatoon (CA)

( * ) Notice: Subject to any disclaimer, the term of this patent is extended or adjusted under 35 U.S.C. 154(b) by 62 days.

(21) Appl. No.: 10/107,407

(22) Filed: Mar. 28, 2002

(65) Prior Publication Data

US 2003/0187567 A1 Oct. 2, 2003

(51) Int. Cl.[7] .......................... F02M 21/02; G06F 19/00
(52) U.S. Cl. ...................... 701/104; 701/109; 701/106; 123/575; 123/525; 123/480
(58) Field of Search ................................. 701/101, 102, 701/103, 104, 105, 106, 109, 110, 115; 123/1 A, 672, 673, 674, 679, 687, 689, 478, 480, 486, 525, 526, 527, 575, 27 GE, 299, 305

(56) References Cited

U.S. PATENT DOCUMENTS

| | | | | |
|---|---|---|---|---|
| 4,140,088 A | * | 2/1979 | de Vulpillieres ............. | 123/478 |
| 5,092,305 A | | 3/1992 | King ........................... | 123/575 |
| 5,131,372 A | * | 7/1992 | Nakaniwa .................... | 123/673 |
| 5,203,305 A | | 4/1993 | Porter et al. ................. | 123/478 |
| 5,586,544 A | * | 12/1996 | Kitamura et al. ............ | 123/480 |
| 5,617,836 A | | 4/1997 | Cullen et al. ................ | 123/674 |
| 5,636,621 A | | 6/1997 | Maki et al. .................. | 123/673 |
| 5,724,242 A | | 3/1998 | Moore-McKee et al. ... | 701/102 |
| 5,964,811 A | * | 10/1999 | Ishii et al. ................... | 701/102 |
| 6,019,093 A | | 2/2000 | Kitagawa ..................... | 123/674 |
| 6,058,905 A | * | 5/2000 | Nagaishi et al. ............ | 123/305 |
| 6,085,132 A | * | 7/2000 | Ishii et al. ................... | 701/102 |
| 6,145,494 A | | 11/2000 | Klopp .......................... | 123/525 |
| 6,289,881 B1 | * | 9/2001 | Klopp .......................... | 123/525 |
| 2002/0185086 A1 | * | 12/2002 | Newman et al. ............. | 123/1 A |

* cited by examiner

Primary Examiner—Willis R. Wolfe
(74) Attorney, Agent, or Firm—Oblon, Spivak, McClelland, Maier & Neustadt, P.C.

(57) ABSTRACT

A powertrain controller of a vehicle provides fuel injection pulses based on gasoline operation. The pulse widths of the fuel injection pulses are modified with reference to air temperature, engine speed, and exhaust gas oxygen (EGO) content to control fuel injectors for an alternative fuel such as natural gas. The EGO content, based on alternative fuel operation, is detected and compared to a desired air-fuel ratio or desired fuel trims to provide error information that is used to adjust the modification of the pulse widths. In response to the error information, a neural network (as an example) dynamically adjust the pulse widths of the alternative fuel injection based on the weights of measured, detected engine speed, EGO, universal exhaust gas oxygen, or air temperatures. The engine operating on alternative fuel is provided with the proper mixture of alternative fuel and air to respond to various engine loads and meet emission standards.

63 Claims, 18 Drawing Sheets

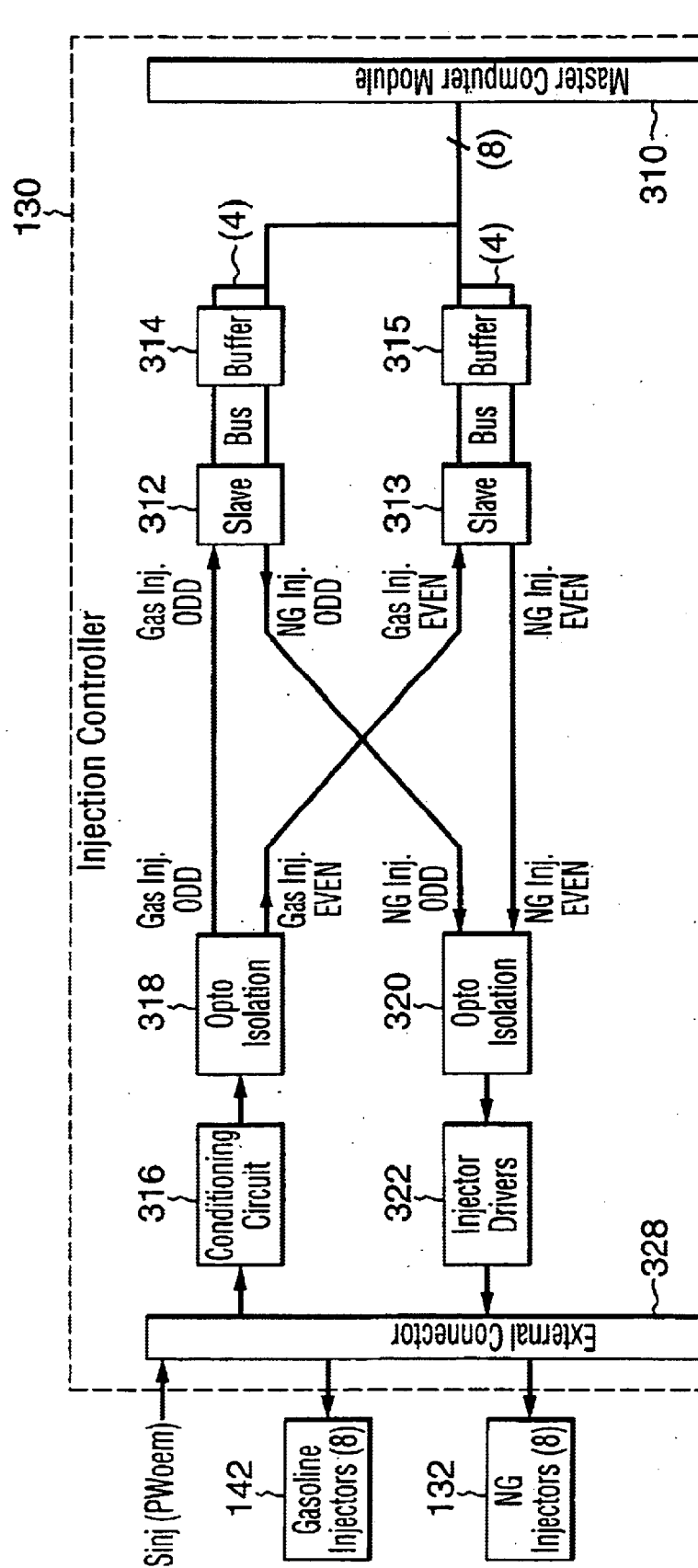

Lambda (1)   PWn (2)   PWoem (3)   GAINcl (4)

STFT (1)   GAINcl (2)   Wcl (5)
LTFT (3)   Lambda (4)

Lambda (1)   PWn (2)
PWoem (3)   PWol (4)

Lambda (1)   PWol (2)
PWsd (3)   GAINol (4)

STFT (1)    GAINcl (2)    Wcl (5)
LTFT (3)    Lambda (4)

STFT (1)    Gainol (2)    LTFT (3)
Lambda (4)  Wolcl (5)

$$y = \Psi\left[\sum_{i=1}^{i=n} S_i W_i + \theta\right] \qquad \Psi[.] = \tanh[.]$$

$W_1, W_2, , W_n$ : Weights (Synapses) $\qquad\qquad \theta$ : Bias (Threshold)

NEURAL CONTROL SYSTEM AND METHOD FOR ALTERNATIVELY FUELED ENGINES

TECHNICAL FIELD

The present invention relates to a method and system for providing multipoint gaseous fuel injection to an internal combustion engine for use in various vehicles and engine-powered machines and more particularly, to a method and system for electrically controlling an engine operating on gasoline and alternative fuels.

BACKGROUND INFORMATION

Alternative fuels such as natural gas, hydrogen, propane, and ethanol are starting to enter the market in the transportation sector. This is due to a number of factors, including lower price, reduced tailpipe emissions, and the security of the fuel supply in comparison to gasoline and diesel fuel. Furthermore, natural gas and propane reduce greenhouse gas (GHG) emissions by about 25% compared to gasoline in automotive applications, while ethanol can reduce GHG emissions by about 30% to 65% depending on the process used to produce the ethanol. Similarly, hydrogen fuelled vehicles can reduce GHG emissions by about 60% to 80%.

Providing systems and methods to enable efficient and productive use of alternative fuels is required.

SUMMARY OF THE INVENTION

In accordance with one aspect of the present invention there is provided a method of modifying a fuel injection signal having a pulse width, the fuel injection signal being provided by a controller managing a fuel powered apparatus receiving gasoline and an alternative fuel for electrical control of a gasoline operated injector and an alternative-fuel operated injector, the controller having information on temperature, exhaust gas oxygen (EGO) content, air-fuel ratio, fuel trims and a control system type, the method comprising: (a) receiving the pulse width of the fuel injection signal; (b) receiving the information on the temperature, the EGO content, and the fuel trims; (c) modifying the pulse width of the fuel injection signal based on the received information, the modified pulse width controlling alternative fuel supplied by the alternative fuel injector to the fuel powered apparatus; (d) determining whether an error criterion is met based on measured information of the fuel powered apparatus operating on the alternative fuel and desired response information; and (e) repeating the steps (c) and (d) when the error criterion is not met.

In accordance with another aspect of the present invention there is provided a system for modifying a fuel injection signal having a pulse width, the fuel injection signal being provided by a controller managing a fuel powered apparatus receiving gasoline and an alternative fuel for electrical control of a gasoline operated injector and an alternative-fuel operated injector, the controller having information on temperature, exhaust gas oxygen (EGO) content, air-fuel ratio, fuel trims and a control system type, the system comprising: a mechanism constructed and adapted to obtain the pulse width of the fuel injection signal; a mechanism constructed and adapted to receive the information on the temperature, EGO content and the fuel trims; a mechanism constructed and adapted to modify the pulse width of the fuel injection signal based on the received information, the modified pulse width controlling the alternative fuel supplied by the alternative fuel injector to the fuel powered apparatus; and a mechanism constructed and adapted to determine whether an error criterion is met based on measured information of the fuel powered apparatus operating on the alternative fuel and desired response information.

In accordance with another aspect of the present invention there is provided a system for controlling fuel injection of an internal combustion engine of a vehicle, the system comprising: sensors applied to the vehicle for sensing parameters relating to the vehicle and the fuel injection; a controller for providing a fuel injection signal having a pulse width based on the sensed parameters; a fuel injector for injecting a first fuel in a first mode and a second fuel in a second mode into the engine; a comparator for comparing the sensed parameters with reference parameters to provide an error signal; a pulse width modifier for changing the pulse width in response to the error signal; and a switch for providing the fuel injection signal to the fuel injector and the pulse width modifier in the first and second modes, where: in the first mode, the fuel injector injects the first fuel into the engine in response to the pulse width of the fuel injection signal, in the second mode, the fuel injector injects the second fuel into the engine in response to a modified pulse width of a modified fuel injection signal, the modified pulse width being one changed by the pulse width modifier, the parameters sensed by the sensors in the second mode being provided to the comparator, the comparator providing the error signal in comparing the sensed parameters to the reference parameters.

In accordance with another aspect of the present invention there is provided a vehicle having an internal combustion engine comprising first and second groups of fuel injectors, the first group of injectors being gasoline injectors, the second group of injectors being alternative fuel injectors; the vehicle comprising: sensing means for providing information on air for use in the engine, engine temperature, and exhaust gas oxygen content; control means for providing a fuel control signal having a pulse width in response to the information provided by the sensing means; means for selecting a path of the fuel control signal; first fuel injection means for controlling the gasoline injection by the gasoline injectors in response to the pulse width of the fuel control signal, while the path of the fuel control signal is selected to the first fuel injection means; pulse modification means for modifying the pulse width of the fuel control signal when the path of the fuel control signal is selected to the pulse modification means; and second fuel injection means for controlling the alternative fuel injection by the alternative fuel injectors in response to a modified pulse width of the fuel control signal.

In accordance with another aspect of the present invention there is provided a computer program product comprising a computer useable medium having computer logic stored therein for modifying a fuel injection signal having a pulse width, the fuel injection signal being provided by a controller managing a fuel powered apparatus receiving gasoline and an alternative fuel for electrical control of a gasoline operated injector and an alternative-fuel operated injector, the controller having information on temperature, exhaust gas oxygen (EGO) content, air-fuel ratio, fuel trims and a control system type, the computer program product including: a mechanism constructed and adapted to obtain the pulse width of the fuel injection signal; a mechanism constructed and adapted to receive the information on the temperature, EGO content and the fuel trims; a mechanism constructed and adapted to modify the pulse width of the fuel injection signal based on the received information, the modified pulse width controlling the alternative fuel supplied by the alternative fuel injector to the fuel powered apparatus; and a mechanism constructed and adapted to determine whether an error criterion is met based on measured information of the fuel powered apparatus operating on the alternative fuel and desired response information.

In accordance with another aspect of the present invention there is provided a computer-readable media tangibly embodying a program of instructions executable by a computer to perform a method of modifying a fuel injection signal having a pulse width, the fuel injection signal being provided by a controller managing a fuel powered apparatus receiving gasoline and an alternative fuel for electrical control of a gasoline operated injector and an alternative-fuel operated injector, the controller having information on temperature, exhaust gas oxygen (EGO) content, air-fuel ratio and fuel trims, the method comprising: (a) receiving the pulse width of the fuel injection signal; (b) receiving the information on the temperature, EGO content, and the fuel trims; (c) modifying the pulse width of the fuel injection signal based on the received information, the modified pulse width controlling the alternative fuel supplied by the alternative fuel injector to the fuel powered apparatus; (d) determining whether an error criterion is met based on measured information of the fuel powered apparatus operating on the alternative fuel and desired response information; and (e) repeating the steps (c) and (d) when the error criterion is not met.

In accordance with another aspect of the present invention there is provided, in a vehicle controller, in which a fuel injection signal having a pulse width is modified, the fuel injection signal being provided by the vehicle controller managing a fuel powered apparatus receiving gasoline and an alternative fuel for electrical control of a gasoline operated injector and an alternative-fuel operated injector, the controller having information on temperature, exhaust gas oxygen (EGO) content, air-fuel ratio and fuel trims, a memory medium comprising software programmed to provide the modified fuel injection signal by a method comprising: (a) receiving the pulse width of the fuel injection signal; (b) receiving the information on the temperature, EGO content, and the fuel trims; (c) modifying the pulse width of the fuel injection signal based on the received information, the modified pulse width controlling the alternative fuel supplied by the alternative fuel injector to the fuel powered apparatus; (d) determining whether an error criterion is met based on measured information of the fuel powered apparatus operating on the alternative fuel and desired response information; and (e) repeating the steps (c) and (d) when the error criterion is not met.

In an exemplary embodiment, the step of modifying the pulse width can be performed by a separate microprocessor from the powertrain controller. The separate microprocessor receives various signals from the engine and outputs the pulse width for the alternative fuel. In some cases the microprocessor affects control over the powertrain controller by modifying the gasoline pulse width for the alternative fuel while preventing the fuel trims on the powertrain controller from saturating. In other cases the powertrain controller affects control over the microprocessor by utilizing the fuel trims from the powertain controller to control the pulse width.

For example, the alternative fuel is natural gas and thus, the engine operates on gasoline and/or natural gas. In the method for modifying a fuel injection signal, as the measured information, a value of an EGO content while the engine is operating on the alternative fuel. Also, as the desired response information, a desired air-fuel ratio as the desired response information is provided. In response to the measured information and the desired response, the pulse width of the fuel injection signal provided by the powertrain controller is modified. The engine operating on alternative fuel is provided with the proper mixture of the alternative fuel and air to respond to various engine loads and meet emission standards.

For example, the alternative fuel is natural gas and thus, the engine operates in a bi-fuel manner, that is, gasoline or natural gas. In the system for modifying a fuel injection signal, a value of an EGO while the engine is operating on the alternative fuel is obtained and a desired air-fuel ratio is provided. In response to the value of the EGO and the desired air-fuel ratio, the pulse width of the fuel injection signal provided by the powertrain controller is modified. The engine operating on the alternative fuel is provided with the proper mixture of the alternative fuel and air to respond to various engine loads and meet emission standards.

For example, the alternative fuel is natural gas and thus, the engine operates in a bi-fuel manner, that is, gasoline or natural gas. The system modifies the pulse width of the fuel injection signal provided by the powertrain controller, in response to a value of an EGO or fuel trim signals while the engine is operating on the alternative fuel at the desired air-fuel ratio. Therefore, the engine operating on the alternative fuel is provided with the proper mixture of the alternative fuel and air.

For example, the alternative fuel is natural gas and thus, the engine operates in a bi-fuel manner, that is, gasoline or natural gas. The pulse modification means modifies the pulse width of the fuel control signal, in response to a value of an EGO while the engine is operating on the alternative fuel and the desired air-fuel ratio. In response to the modified pulse width, the second fuel injection means controls the alternative fuel injection of the second group of injectors. Therefore, the engine operating on the alternative fuel is provided with the proper mixture of the alternative fuel and air and the vehicle is operated on various engine load conditions and meets emission standards.

BRIEF DESCRIPTION OF THE DRAWINGS

Embodiments of the present invention will now be described by way of example with reference to the accompanying drawings in which.

DETAILED DESCRIPTION

I. Technical Background

Figure 1:
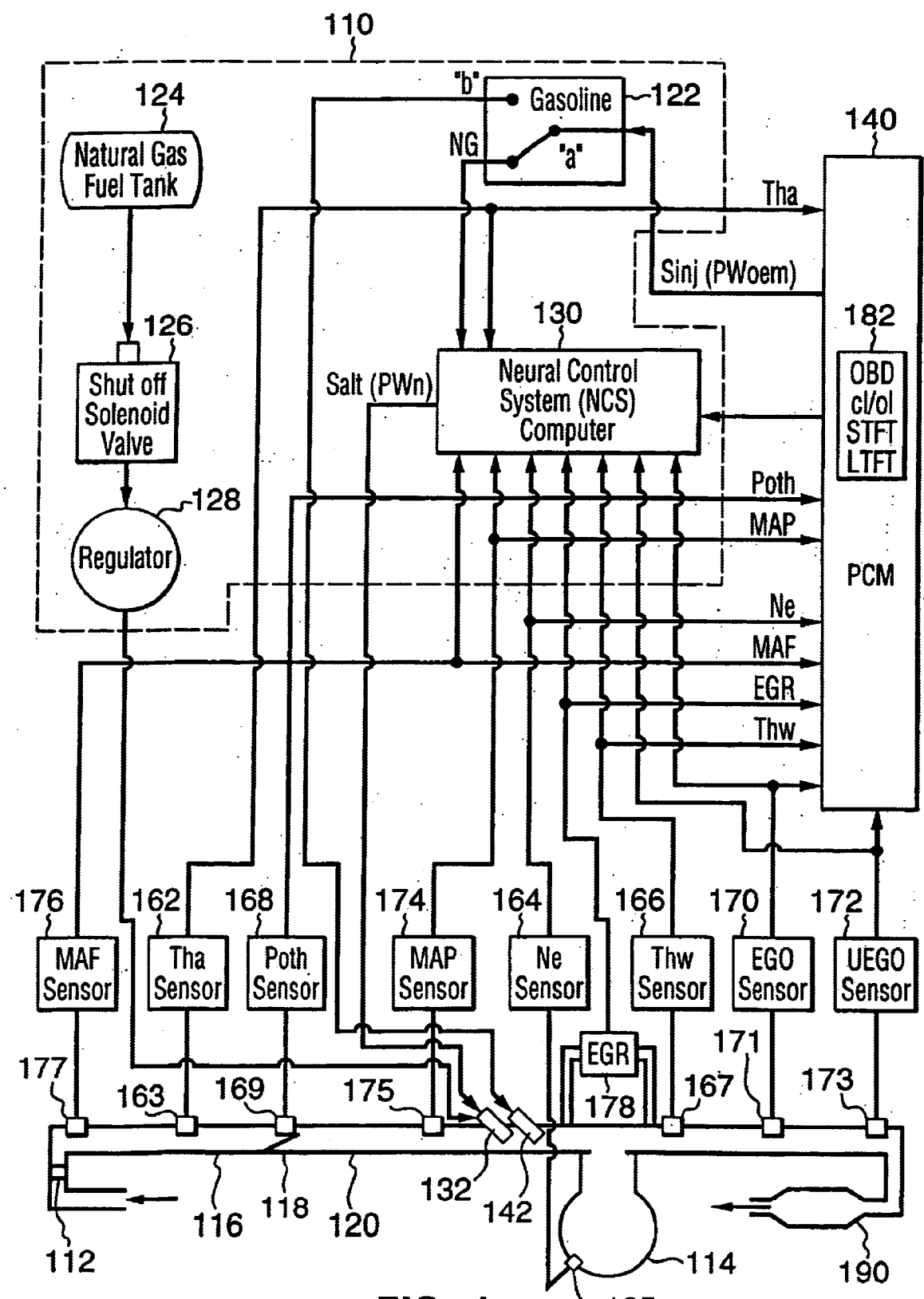
FIG. 1 is a schematic diagram showing a control system for a bi-fuel engine and a neural control system (NCS) according to an embodiment of the present invention.

Engines in vehicles must be supplied with the proper mixture of fuel and air to respond to various engine loads and meet tailpipe emission standards. This is the responsibility of the engine fuel control computer commonly called a powertrain control module (PCM). A PCM includes a microprocessor and associated memory chips, input/output devices and the like, and is programmed by a vehicle manufacturer to control engine functions such as air and fuel intake. The PCM receives data concerning engine operation from many electrical and electromechanical sensors. Within each PCM, there are certain operating parameters, or coefficients, for which values are preset based on characteristics of the fuel used and engine displacement. These parameters are called calibration coefficients, and their values affect fuel consumption, performance of the engine, and emissions produced.

In gasoline fuel-injected engines, the PCM is calibrated based on gasoline properties. Gasoline is stored as a liquid and must be vaporized for combustion over a −40° C. to +40° C. ambient temperature range. Hence, engine calibration is not a trivial matter and consists of a host of algorithms and tables containing calibration coefficients. Most engines utilize a speed-density correlation to calculate the required fuel flow rate given the airflow rate through the engine. The airflow rate is either measured directly or calculated from the measurement of the engine speed (Ne), intake air density, engine displacement, and volumetric efficiency. The fuel flow rate is calculated from the desired (i.e., stoichiometric) air-fuel ratio and air flow rate. In stoichiometric combustion there is enough oxygen to convert all the fuel into completely oxidized products.

The required fuel injector pulse width is then calculated from the fuel flow rate based on an equation for flow rate of the injector that is used in the engine. If the speed-density pulse width is used to activate the injector without air-fuel ratio feed back, the operation is termed open-loop control. For closed-loop control a proportional-integral-derivative (PID) controller with oxygen sensor feedback is usually used to control air-fuel ratio at near stoichiometric conditions to optimize the efficiency of the catalyst in the exhaust gas stream, minmizing tailpipe emissions.

The output of the PID controller, which is called the short-term fuel trim (STFT), modifies the speed-density pulse width to correspond to feed back from the oxygen sensor. Long-term fuel trim (LTFT) is used to adjust the pulse width for disturbances like clogged air filters or clogged injectors while maintaining a stoichiometric air-fuel ratio control. Usually the LTFT is calculated from the STFT in such a way that as the LTFT increases as the STFT decreases, preventing the STFT from saturating. However, if the STFT or LTFT compensate the speed-density pulse width by more than 35%, for example, they become saturated. This will generate a problem/trouble code on an on-board diagnosis (OBD) system, which will cause the control system to go to open-loop control and register an engine trouble code, illuminating a "check-engine" light.

When alternative fuels are to be used in an engine designed for gasoline, the PCM must be re-calibrated for the new fuel. In the case of using gaseous fuels like natural gas, propane, or hydrogen the difference in calibration values can be substantial, and the cost of re-calibration can be expensive given the large number of engines.

The following additional equipment is typically required to adapt a gasoline fuel-injected engine to natural gas, hydrogen, or propane: a gas storage tank, a gas regulator, gas fuel injectors, and a computer calibrated for the alternative fuel. When this equipment is installed in parallel with the gasoline fuel system, the vehicle can be either run on the alternative fuel or on gasoline at the flick of a switch, which is termed bi-fuel. If access to the calibration tables is not provided by the PCM's original equipment manufacturer (OEM), then a separate control computer is installed in parallel with the PCM. Such a fuel control system is known and includes all the auxiliary equipment mentioned above, plus sensors that measure a manifold air pressure MAP, an intake air temperature Tha, an engine speed Ne, and a coolant temperature Thw. The separate control computer contains calibration tables as well as control algorithms/software mentioned above for the alternative fuel.

Modern gasoline engine fuel control systems utilize pulse-width modulation to control the amount of fuel entering an engine. For example, a fuel injector can be activated for 7 (ms) at every spark event (or ignition) to provide fuel at the engine idle condition. When an alternative fuel system like natural gas is used, the values for the injector pulse width must be changed to say 6 (ms) for natural gas injection, a factor of 0.86 decrease in pulse width. If this doesn't happen, the engine will run rich of stoichiometry, resulting in reduced power output, higher exhaust emissions, engine codes being set, and possible engine damage.

A fuel control system may also include control signals, generated by the PCM. The control signals are modified by a factor taken from an alternative fuel control module, and are used to activate an independent fuel control valve to supply an alternative fuel to the engine. While such systems can be sufficient when the vehicle is fully warmed up and operating at a certain operating point, they are unacceptable during engine start, warm-up, acceleration, and deceleration. An additional problem is that different calibration factors are required for each engine on the market. If a single factor is used, the engine will not start in cold weather; acceleration will be poor; and tailpipe emissions will increase significantly.

For example, during engine start at −20° C. the pulse width on gasoline must be reduced from 110 (ms) to 18 (ms) on natural gas to start the engine, a decrease by a factor of 6 in pulse width. However, at idle the pulse width must be decreased by a factor of 0.75 at −20° C. This is sufficiently different than the factor of 0.86 decrease for a fully warm engine mentioned above that can cause drivability problems and engine trouble codes. The problem is that one factor is insufficient to produce acceptable performance and emissions over the full speed-load-temperature range of an engine. Nor will one factor work for all the engines on the market. A complete range of factors, or set of calibration tables, is required for different engines operating under different loading and environmental conditions. Providing these tables is costly given the time required for manual calibration.

Methods for calculating the factors (mentioned above) between the gasoline and natural gas pulse width based on the temperature of the gas and the energy content of the two fuels are known in the art. These types of conventional systems improve operation to a certain extent; however, it is too simplistic to cover the full speed-load-temperature range of an engine. This is particularly true during significant gasoline enrichment at cold-start, acceleration, or power enrichment phases of operation.

The present invention describes a system and a method for determining a range of factors suitable for a particular engine that are established while the engine is running on the road. Various control techniques have been developed that will train gasoline engines to operate on natural gas, propane, hydrogen, or ethanol producing acceptable performance, driveability and emissions over the full operating range.

A host of factors can be installed in a calibration table that can operate the engine over the full speed-load-temperature range; however, this requires considerable time to be spent on a dynamometer calibrating the engine. The control system and method of the present invention presents a technique for the engine to calibrate itself for an alternative fuel as the vehicle is driven on a chassis dynamometer or on the road, reducing calibration costs.

By way of background, the various techniques of the present invention can use (in exemplary embodiments) neural network control. A neural network is a massively parallel distributed processor made up of simple processing units, which has a natural propensity for storing experiential knowledge and masking it for available use. Neural networks have learning and adaptation capabilities, thus neural networks can work as a "black box" without requiring a priori knowledge of the plant dynamics under control.

Neural networks are also adaptive systems, but do not require a model of the system. They "learn" or create an internal structure that reflects the system dynamics (linear or nonlinear) through continuous or batch training. Their performance relies on the richness and the information content of the signals that are used for their training.

II. Background of the Present Invention

In exemplary embodiments, the present invention presents an intelligent control system that utilizes neural network techniques to self-calibrate an auxiliary computer, or microprocessor, for natural gas, hydrogen, propane, or ethanol as a fuel.

By way of background, for example, the present invention provides a neural network to adapt gasoline engines to operate on alternative fuels. The method is based on a number of separate arrays of neurons that are trained by separate algorithms when the PCM is under closed loop or open loop control. The training algorithms modify the gasoline pulse width produced by the PCM, a pulse width calculated separately, for natural gas, hydrogen, propane, or ethanol combustion.

In a first example, training is conducted utilizing a universal exhaust gas oxygen (UEGO) sensor or a wide range oxygen sensor that measures the air-fuel ratio as a linear function of oxygen content of the exhaust. In a second example, training is conducted by conventional exhaust gas oxygen (EGO) sensors or a "bang—bang" oxygen sensor that indicates if the exhaust is rich or lean of stoichiometry as a function of the oxygen concentration of the exhaust. The output of the sensor is 1 volt if the exhaust is rich or zero volt if the exhaust is lean. In control systems vocabulary this non-linear sensor is termed a "bang—bang" oxygen sensor, which indicates if a switch is on or off in other applications. A third example utilizes the short-term fuel trim (STFT) and long-term fuel trim (LTFT) from the PCM for training when the PCM is in the closed-loop condition.

III. Embodiments

FIG. 1 shows a control system for an engine operating on gasoline and an alternative fuel according to an embodiment of the present invention. In the embodiment, the alternative fuel is natural gas. It may be another gaseous fuel, for example, propane. The system includes a bi-fuel alternative fuel system 110. Air taken through a filter 112 enters an internal combustion engine 114 through an intake 116 and it passes through a throttle 118 to an intake manifold 120. Within the alternative fuel system 110, with a bi-fuel switch 122 in its natural gas position "a", fuel from a natural gas fuel tank 124 passes through a shut-off solenoid valve 126, a regulator 128, and alternative fuel or natural gas fuel injectors 132 and is mixed with air in the intake manifold 120. The alternative fuel system 110 includes a computer, or microprocessor, containing a neural control system (NCS) 130 for modifying the pulse widths of a signal from a powertrain control module (PCM) 140.

The engine 114 is a multi-port, fuel-injected engine. Most multi-port, fuel-injected engines can have up to eight natural gas injectors, one for each cylinder. The eight natural gas injectors are additional to eight gasoline injectors for bi-fuel applications. For throttle-body fuel injection systems, there is usually one or two injectors located up stream of the throttle. The present invention can be applied to both multi-port and throttle-body fuel-injection systems and with engines having ten or more cylinders.

The PCM 140, which can be provided by an original equipment manufacturer, generates a gasoline injection signal Sinj having an injection pulse width PWoem. The signal Sinj is a series of triggered synchronized pulses which change between 0 V and 12 V, where 0 V is the condition for the injector to be open and 12 V is the condition for the injector to be closed. The pulse width PWoem is measured by the NCS computer 130 where it is modified to a pulse width PWn for natural gas combustion according to neural control algorithms (discussed in detail below).

The NCS computer 130 provides a natural gas injection signal Salt having the modified injection pulse width PWn. The signal Salt is fed to the natural gas fuel injectors 132 through injector drivers (not shown) to actuate them. The resultant fuel flow rates from the natural gas fuel injectors 132 control the composition of the air-fuel mixture that is drawn into the engine 114. With the bi-fuel switch 122 in a gasoline position "b", the gasoline injection signal Sinj having the injection pulse width PWoem is fed directly to the gasoline injectors 142 through injector drivers (not shown) and thus, the alternative fuel control system 110 is by-passed. Gasoline from a gasoline tank (not shown) is fed to the gasoline injectors 142 and is mixed with air in the intake manifold 120.

Various sensors provide the PCM 140 with their sensing outputs or sensed values. An air temperature sensor 162 provides an intake air temperature Tha. An engine speed sensor 164 provides an engine speed Ne. A coolant temperature sensor 166 provides a coolant temperature Thw. A throttle position sensor 168 provides a throttle position Poth. An exhaust gas oxygen (EGO) sensor 170 provides an indication if the engine is running rich or lean of stoichiometry. A universal exhaust gas oxygen (UEGO) sensor 172 provides a UEGO or an indication of lambda, the actual air-fuel ratio. The EGO sensor and/or the UEGO sensor are used to control the air-fuel ratio of the exhaust near stoichiomentric to optimize the efficiency of a catalyst 190. The catalyst 190 improves tailpipe emissions by removing carbon monoxide, oxides of nitrogen, and hydrocarbons from the exhaust. A manifold air pressure (MAP) sensor 174 provides a MAP value. A mass airflow (MAF) sensor 176 provides a MAF value. An exhaust gas recirculation (EGR) sensor 178 provides an EGR value.

In some engines, a UEGO sensor 172 replaces the EGO sensor 170. Engine load is determined by either the MAP or MAF, depending on the engine. The EGR sensor 178 is included in the engine 114 to reduce tailpipe emissions of oxides of nitrogen.

The MAF, Tha, Poth and MAP sensors 176, 162, 168 and 174 have respective sensing devices 177, 163, 169 and 175, which are positioned in the air intake stream. The Ne sensor 164 has sensing devices 165 that are located in the engine 114. The Thw, EGO and UEGO sensors 166, 170 and 172 have respective sensing devices 167, 171 and 173, which are positioned in the gaseous exhaust stream. The sensing outputs (MAF, Tha, Poth, MAP, Ne, EGR, Thw, EGO and UEGO) are used by the PCM 140 to control the air-fuel mixture by generating the injection pulse width PWoem. This maintains consistent operation of the engine 114 under various operating conditions on gasoline. The PCM 140 is generally installed in a vehicle (not shown) at the time of manufacture to run using gasoline as fuel.

The alternative fuel system 110 is provided with the NCS computer 130, which is an auxiliary computer or a microprocessor inserted between the PCM 140 and the natural gas fuel injectors 132. The NCS computer 130 measures the injection pulse width PWoem received from the PCM 140 and converts it into the output pulse width PWn that can be used to operate the natural gas fuel injectors 132. The pulse width PWoem generated by the PCM 140 is based on the fuel being gasoline. The NCS computer 130 drives and controls the natural gas fuel injectors 132 when alternative fuel is used in the alternative fuel system 110 and allows a proper air-fuel mixture to be maintained when an alternative fuel such as natural gas is used in the engine 114. The NCS computer 130 also receives sensing outputs Tha, MAF, MAP, Ne, EGR, Thw, Tha, EGO and UEGO from the respective sensors.

Furthermore, the NCS computer 130 receives information on on-board diagnostics (OBD), including: the open-loop status (ol) or the closed-loop status (cl) of the PCM 140, signals of the short-term fuel trim (STFT) and the long-term fuel trim (LTFT) from an OBD system 182 on the PCM 140. The OBD system 182 continuously monitors a plurality of operating parameters (e.g., over 50) on the vehicle as the vehicle is running to determine if they are in the proper range. If they are out of range, a code will be recorded internally identifying the problem. This code can be retrieved at a service center with the proper monitoring equipment for the vehicle. If the code is persistent and will not clear in normal use, then the engine malfunction indicator or check engine light on the dashboard of the vehicle is illuminated.

Figure 2:
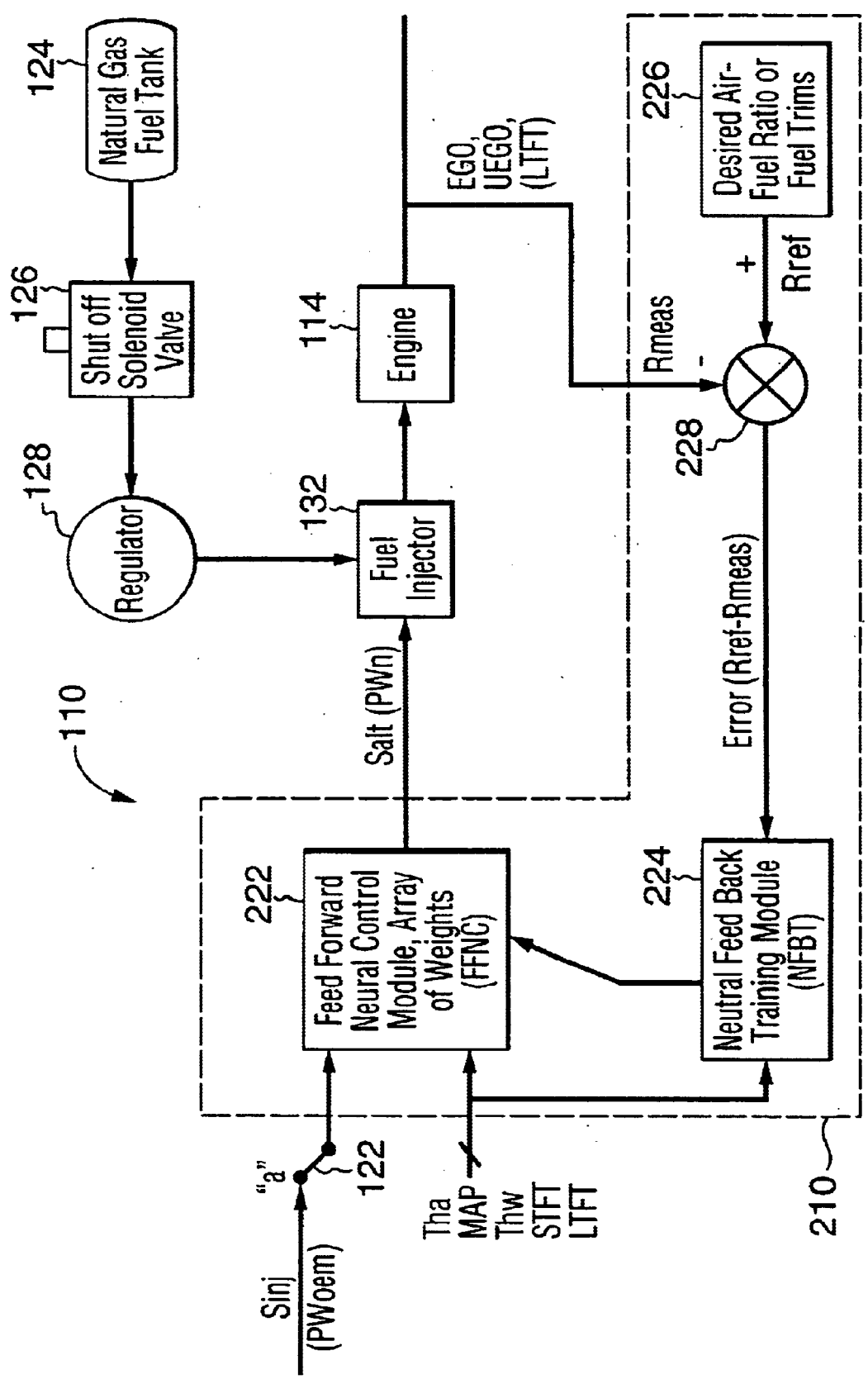
FIG. 2 illustrates an implementation functional block diagram of the NCS.

FIG. 2 shows a functional block diagram of the alternative fuel system 110 with the NCS. The NCS computer 130 included in the alternative fuel system 110 has a parameter (or weight) determination system 210. The determination system 210 calculates values for the operating weights of the alternative fuel system 110 according to the type of fuel being used and characteristics of the engine 114. The operating weights will vary according to different types of fuel that may be used and the size and type of engine. The determination system 210 includes a feed forward neural control (FFNC) module 222 that receives the gasoline injection signal Sinj having the pulse width PWoem from the PCM 140, various sensor outputs (MAP, Thw, Tha) and the fuel trims (STFT and LTFT) from the OBD system 182.

Within the NCS computer 130, an array of weights are continuously adjusted by a training algorithm in a neural feed back training module (NFBT) module 224 based on an error between a desired air-fuel ratio Rref and a measured air-fuel ratio Rmeas. A subtraction circuit 228 is provided with the desired air-fuel ratio Rref by a reference setting device 226. Also, the subtraction circuit 228 is provided with EGO or UEGO, as the measured air-fuel ratio Rmeas. The training error can also be based on the long-term fuel trim (LTFT) from the OBD system 182. The subtraction circuit 228 provides an error (Rref−Rmeas) to the NFBT module 224 which in turn calculates the training weights for the FFNC module 222.

The MAP from the MAP sensor 174, the Thw from the Thw sensor 166 and the Tha from the Tha sensor 162 are also provided to the NFBT module 224.

In the NCS computer 130 (of the present embodiment), the training continues until an error criteria is satisfied, and then training is stopped. During the training, the weight determination system 210 calculates operating weights. In the present embodiment, the NCS computer 130 is capable of being used and adapts to a large number of different fuels. The NCS computer 130 has two functions: (1) adjusting or modifying the fuel injection pulse width based on the neural weights in the FFNC module 222, and (2) measuring air-fuel ratio in the exhaust stream (EGO or UEGO), or the fuel trims (LTFT or STFT) from the OBD system 182 on the PCM 140, for the NFBT module 224 for use in calculating the training weights.

In the training mode, the FFNC module 222 uses the values of the sensor outputs and the fuel trims to determine proper operating parameter values (weights) for the fuel being used. The NFBT module 224 is used when there are air-fuel ratio (i.e., EGO or UEGO) changes or the fuel trim (i.e., STFT or LTFT). These changes may be due to installation of the NCS computer 130 in a different vehicle with a different engine displacement, the use of a different fuel, or some other changes that affect the operation of the alternative fuel system 110.

The sensor outputs and the fuel trims are fed to the FFNC module 222 where operating parameter values are applied to the values of the sensor outputs and the fuel trims and processed according to a control algorithm. A result from the processing is used to create a control signal for the natural gas fuel injectors 132. In the NFBT module 224, the result is combined with the desired air-fuel ratio Rref to determine how closely the weights in the FFNC module 222 are to proper values for the system (i.e., values that produce the ideal response). The result of the combination of the desired ratio Rref and the response from the FFNC module 222 is processed by the NFBT module 224 that adjusts the operating parameter values, or training weights, so that the output response from the FFNC module 222 to the sensor outputs will be as close as possible to the desired ratio Rref In this case, the desired ratio Rref is near the stoichiometric air-fuel ratio control to optimize exhaust emissions and maintain the fuel trims on the PCM below saturation.

Once the weights are adjusted and training is completed, the next step is to test the FFNC module 222 response to inputs it has not seen before. This can be done on the road or on a dynamometer. If the FFNC module 222 responds correctly with good driveability, acceptable power, and acceptable tailpipe emissions, it is said that generalization of the neural network has taken place, no further training will be necessary, and the vehicle is deemed road worthy.

Figure 3B:
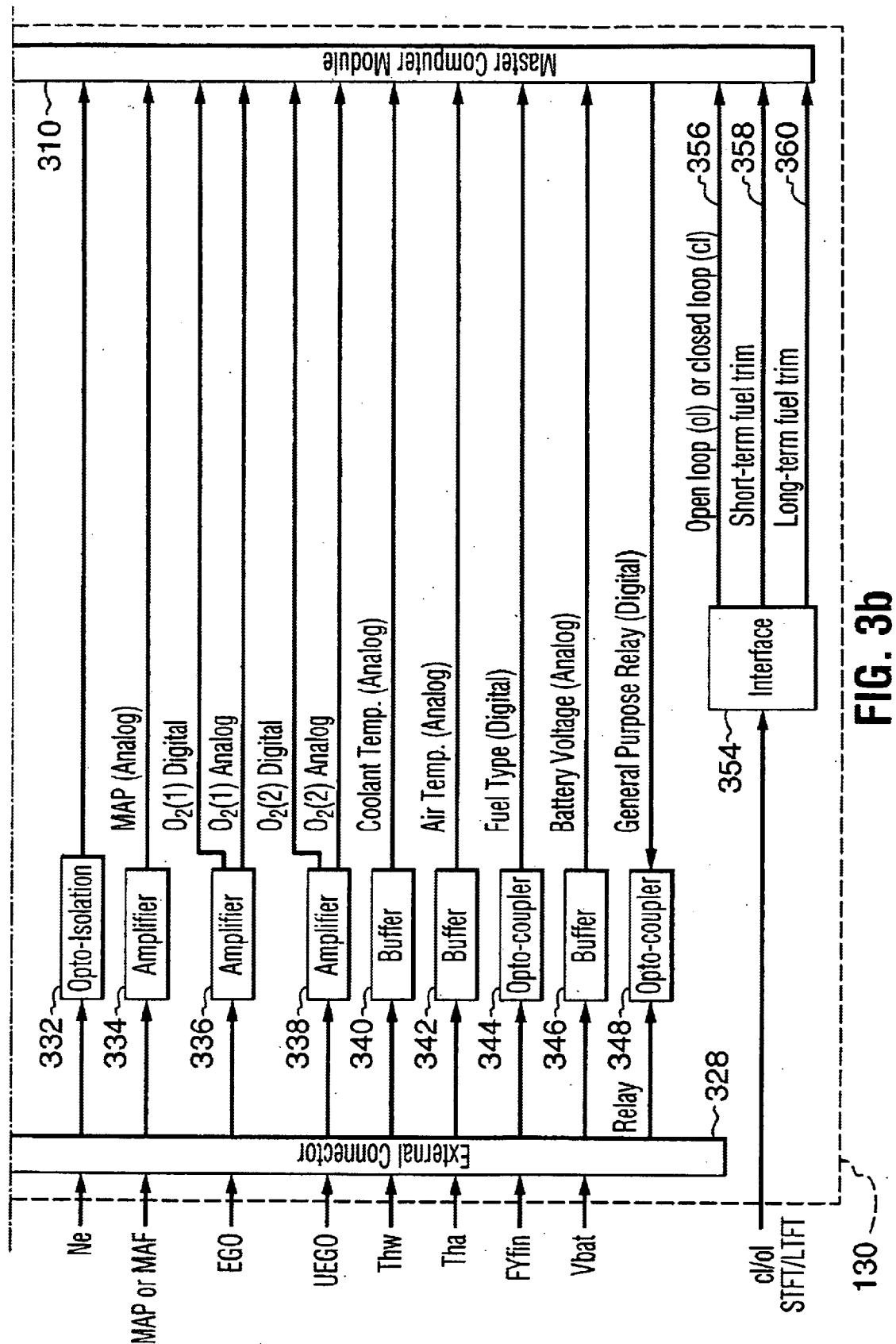
FIG. 3 is a functional diagram showing a detail of the NCS.

FIG. 3 shows a functional block diagram of the NCS computer 130 that includes a master computer module 310 (e.g., an 8, 16, or 32-bit (or larger) microprocessor) and first and second slave computer modules 312 and 313. The slave computer modules 312 and 313 are connected to the master computer module 310 through buffers 314 and 315, respectively. The two slave computer modules 312 and 313 measure the pulse width of up to four gasoline fuel injectors 142 each through a conditioning circuit 316 and an opto-isolation module 318.

The two slave computer modules 312 and 313 also calculate the correct natural gas mixture using pulse width PWn for up to four natural gas fuel injectors 132 for each slave module. The eight neural pulse widths PWn are passed through opto-isolation circuitry 320 and eight injector drivers 322 to activate each natural gas fuel injector 132 in its proper sequence for combustion in each cylinder.

The weight determination system 210 shown in FIG. 2 is located in the master computer module 310. This is where the training algorithm in the NFBT module 224 updates the array of neurons in the FFNC module 222 shown in FIG. 2. The master computer module 310 also reads the crankshaft position or some other sensors to determine the engine speed Ne from the sensor 164. In addition, it reads the following engine operating parameters MAP or MAF, EGO or UEGO, Thw, Tha, a fuel type TYfu (from a fuel type sensor (not shown)) and a battery voltage Vbat (from a voltage sensor (not shown)). The signals of these parameters or values are provided to the master computer module 310 through a connector circuit 328 and respective circuits: i.e., an opto-isolation circuit 332, amplifiers 334, 336, 338, buffers 340, 342, 346, and opto-couplers 344, 348. Also, the master computer module 310 receives through a suitable interface 354 information on whether the air-fuel ratio controller in the PCM 140 is in the open-loop status (ol) or in the closed-loop status (cl) and on the fuel trims, STFT and LTFT.

Figure 4:
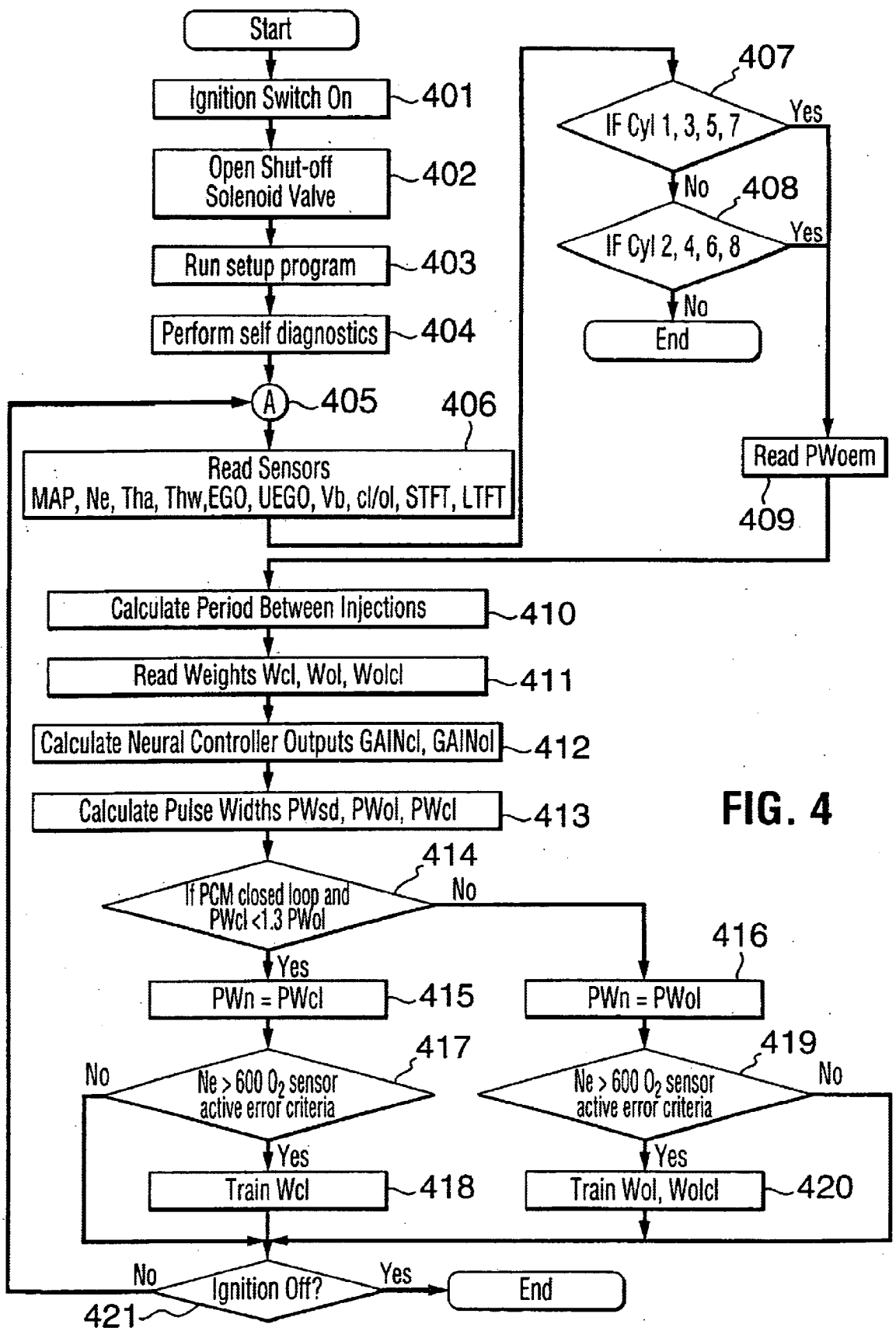
FIG. 4 is a flowchart showing the overall operation of the NCS.

FIG. 4 is a flow chart showing the operation of a neural type process of the NCS computer 130 shown in FIG. 1. The neural process is initiated with an ignition switch (not shown) in its "on" position (step 401), and the bi-fuel switch 122 shown in FIG. 1 (e.g., a dashboard mounted fuel switch) in its natural gas (or alternative fuel) position "a". This opens the natural gas shut-off solenoid valve 126 (step 402), runs a setup program (step 403), and initiates self-diagnostics (step 404). The neural program then enters its main loop at A 405. The first action is to read the following engine sensor outputs at step 406 (the Ne sensor 164, the MAP sensor 174 or MAF sensor 176, the EGO sensor 170 or the UEGO sensor 172, the Thw sensor 166, the Tha sensor 162, the fuel type sensor, and the battery voltage sensor).

The signals from the OBD system 182 on the PCM 140 shown in FIG. 1 are then read via the interface 354 shown in FIG. 3. This determines if the control system in the PCM 140 is in the open-loop status (ol) or the closed-loop status (cl) on the line 356 shown in FIG. 3, and reads the STFT value on the line 358 and the LTFT value on the line 360. There can be two STFTs and two LTFTs in engines with more than four cylinders, such as one for each side of a V6 or V8 engine. As well, all sensor signals described above are not always required.

In the next step, the two slave computer modules 312 and 313 read pulse widths PWoem generated by the PCM 140. In a case of the pulse widths relating to the gasoline injectors 142 at cylinders 1, 3, 5 and 7 in an eight-cylinder engine (true at step 407), the first slave computer module 312 reads the pulse widths (step 409). In a case of the pulse widths being relating to the gasoline injectors 142 at cylinder 2, 4, 6 and 8 in the eight-cylinder engine (true at step 408), the second slave computer module 313 reads the pulse widths (step 409).

In the next step, the period between injections is calculated (step 410). This is followed in sequence by the following operations or calculations for open- and closed-loop operation of the PCM 140:

At step 411, neural controller weights, Wcl, Wol, and Wolcl are read.

At step 412, neural controller outputs, GAINcl and GAINol are calculated. GAINcl is a closed-loop gain and GAINol is an open-loop gains.

At step 413, neural controller pulse widths, PWsd, PWol and PWcl are calculated. PWsd is a theoretical pulse width or a standard speed density natural gas pulse width. PWcl is a closed-loop pulse width or a modified gasoline pulse width from the PCM 140. PWol is an open-loop pulse width or a modified standard speed density natural gas pulse width.

PWol is based in part on the calculation of a theoretical pulse width PWsd from a speed-density relationship and in part on GAINol. At step 414, it is determined if the PCM 140 is in the closed-loop status (cl) and if the PWcl is less than PWol by a certain factor (in this case the factor is 1.3). This factor can in practice range between 1 and 1.5. If this is true at step 414, then the output pulse PWn will be set equal to PWcl (step 415). If not, the PWn will be set equal to PWol (step 416).

The next part of the control process involves training the weights Wol, Wcl, and Wolcl for open- and closed-loop operation. It is determined at step 417 if the engine speed Ne is greater than 600 rpm, if the EGO sensor 170 or the UEGO sensor 172 is active and if the error criterion is not met between the desired Rref and the measured air-fuel ratio, or long-term fuel trim, Rmeas (see FIG. 2).

When the step 417 determination is true, the neural controller weight for closed-loop, Wcl, is trained (step 418). Following step 418 and when the step 417 determination is false, the program returns to point A 405 and the cycle repeats itself. Following step 416, it is determined whether open-loop training is required (step 419). Wol is trained (step 420) if the engine speed (Ne) is greater than 600 rpm and if the exhaust gas oxygen sensor (EGO or UEGO) is active and if the error criterion is not met between the desired Rref and the measured air-fuel ratio Rmeas.

The training weight Wolcl covers a condition where the PCM is closed loop, but PWcl >1.3 PWol. Wolcl is trained (step 420) if the engine speed (Ne) is greater than 600 rpm and if the exhaust gas oxygen sensor (EGO or UEGO) is active and if the error criterion is not met between the desired Rref and the measured LTFT Rmeas. The control loop then cycles back to point A 405, and the sensor outputs are read again (step 406). When the ignition system is turned off (true at step 421), the process is complete.

EXAMPLE

Figure 5:
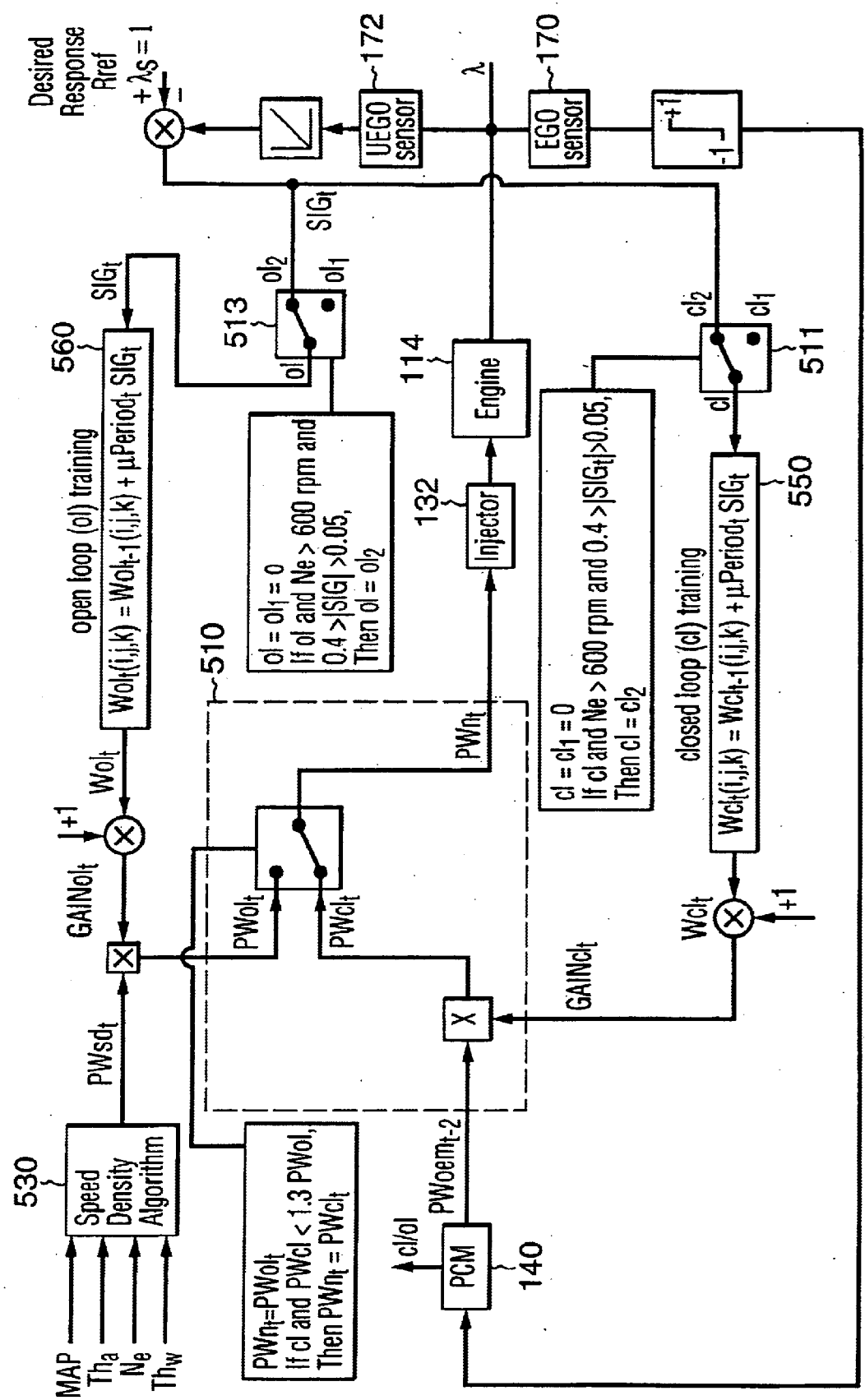
FIG. 5 is a block diagram showing a detailed configuration of the NCS utilizing a universal exhaust gas oxygen (UEGO) sensor output for training when a powertrain control module (PCM) is in an open-loop or a closed-loop.

FIG. 5 shows an example of a neural control system (NCS) according to an exemplary embodiment of the present invention using the UEGO for training and the OBD port to determine whether the PCM 140 is in the closed-loop status (cl) or the open-loop status (ol).

The EGO sensor 170 provides a bang—bang (EGO) signal to the PCM 140. As mentioned earlier, the first and second slave computer modules 312, 313 shown in FIG. 3 measure the pulse width $PWoem_t$ at each gasoline injector actuator event at time t. In the first example of the NCS shown in FIG. 5, a single slave computer 510 (corresponding to the slave computer 312 or 313 in FIG. 3) and a master computer (corresponding to the master computer module 310 shown in FIG. 3) for measuring the pulse width and performing the training are shown. The second slave is not shown for clarity.

A closed-loop training switch 511 is provided that is selected if the PCM is closed loop (at its position "$cl_2$"), an open-loop training switch 513 for selecting the open-loop status (at its position "$ol_2$") and a pulse width calculator 530 including a speed-density algorithm for the theoretical pulse width PWsd at time t. Switch 511 at position $cl_2$ activates closed-loop training in element 550; at position $cl_1$, cl=0 and training is stopped. Switch 513 at position $ol_2$ activates open-loop training in element 560; at position $ol_1$, ol=0 and training is stopped.

FIG. 5 shows two main loops for calculating a neural pulse width at time t, $PWn_t$, which operate the alternative fuel or natural gas fuel injectors 132: one for calculating the closed-loop pulse width at time t, $PWcl_t$, and another for calculating the open-loop pulse width at time t, $PWol_t$. Which pulse width is used depends on whether the PCM 140 is in the closed-loop status (cl) or the open-loop status (ol) and whether $PWcl_t$ is some factor (e.g., 30%) greater than $PWol_t$. The process proceeds as follows: initially, $PWn_t = PWol_t$; however, if the PCM 140 is in the closed-loop status cl and $PWcl_t$<1.3 $PWol_t$, then $PWn_t = PWcl_t$.

$PWcl_t$ is calculated using the following relationships at time t, the time that the $PWoem_t$ event takes place:

$$PWcl_t = GAINcl_t \, PWoem_{t-2} \qquad (1)$$

The output of the closed-loop neural controller, $GAINcl_t$, is calculated from the training weight, $Wcl_t$ (i, j, k), as follows:

$$GAINcl_t = 1 + Wcl_t(i, j, k) \qquad (2)$$

$Wcl_t$ (i, j, k) is a thee-dimensional array of weights with the following coordinates: i=coolant temperature (Thw); j=manifold air pressure (MAP) or manifold air flow (MAF); k=engine speed (Ne).

$PWol_t$ is calculated from the following relationships at time t:

$$PWol_t = GAINol_t \, PWsd_t \qquad (3)$$

$$GAINol_t = 1 + Wol_t(i, j, k) \qquad (4)$$

The following training algorithms are used to calculate the two three-dimensional arrays that store the closed-loop weights, Wcl (i, j, k), and open-loop weights, Wol (i, j, k):

$$Wcl_t(i, j, k) = Wcl_{t-1}(i, j, k) + \mu Period_t SIG_t \qquad (5)$$

$$Wol_t(i, j, k) = Wol_{t-1}(i, j, k) + \mu Period_t SIG_t \qquad (6)$$

where $\mu$=training rate.
The time or sampling interval between injections, $Period_t$, is calculated from the following equation:

$$Period_t = \frac{60 \cdot 1000 \cdot 2}{Ne N_{cyl}} \qquad (7)$$

where

Ne=engine speed (rpm), and $N_{Cyl}$=number of cylinders in the engine.

In automotive engineering, the air-fuel ratio A/F is defined by the ratio of the air mass flow rate ma and the fuel mass flow rate $m_f$.

In stoichiometric combustion, there is enough oxygen to convert all the fuel into completely oxidized products. The air-fuel ratio at which complete combustion takes place is called the stoichiometric air-fuel ratio $A/F_s$ and lambda ($\lambda$) is defined as the ratio of A/F and $A/F_s$. The error $SIG_t$ between the desired ratio Rref defined by the stoichiometric condition ($\lambda_s$=1) and the actual air-fuel ratio Rmeas measured by the UEGO sensor ($\lambda$) is determined from the following equation:

$$SIG_t = 1 - \lambda \qquad (8)$$

Training the open and closed-loop weights, $Wol_t$ (i, j, k) and $Wcl_t$ (i, j, k), proceeds as follows: Initially, both the open-loop and closed-loop training switches shown in FIG. 5 are not in the training mode (ol=$ol_1$ and cl=$cl_1$). Open-loop training can be continuous because saturating the STFT value or the LTFT value in the PCM 140 is not possible. However, if this is troublesome, an error criteria can be applied as follows: If the absolute error, $SIG_t$ is greater than 0.05 (5%) or less than 0.4 (40%), then ol=$ol_2$ and open-loop training begins. In the closed-loop mode if the absolute error, $SIG_t$, is greater than 0.05 or less than 0.4, then cl=$cl_2$ and closed-loop training begins.

Air flowrate, $m_a$, through the engine can be measured utilizing the MAF sensor 176, or calculated using a speed-density algorithm in the pulse width calculator 530. A theoretical base pulse width $PWsd_t$ based on the airflow rate $m_a$ and fuel flow rate $m_f$, can be calculated as follows:

$$m_a = \eta_v \rho V \frac{Ne}{2} \quad (9)$$

$$m_f = \frac{m_a}{A/F_s} \quad (10)$$

where $\eta_v$=the volumetric efficiency of the engine
$\rho$=inlet air density
V=volumetric displacement of the engine
The mass of fuel injected into a cylinder can be calculated as follows:

$$M_f = \frac{2m_f}{NeN_{cyl}} \quad (11)$$

Substituting equation 9 into 10 and equation 10 into 11 yields the following:

$$M_f = \frac{\eta_v \rho V}{A/F_s N_{cyl}} \quad (12)$$

A formula for the required pulse width, PWsd, in (ms) for a fuel injector can be expressed by the following linear equation:

$$PWsd = k_f M_f + T_v \quad (13)$$

where $k_f$=injector coefficient
$T_v$=injector off set (ms)
Substituting equation 12 into 13 provides the speed-density pulse width as follows:

$$PWsd_t = \frac{k_f \eta_v \rho V}{A/F_s N_{cyl}} + T_v \quad (14)$$

The volumetric efficiency can be estimated from the following theoretical relationship:

$$\eta_v = \left(\frac{M}{M_a}\right)\left(\frac{MAP}{P_a}\right)\left(\frac{T_a}{T_{ha}}\right)\frac{1}{[1+(F/A)]} \quad (15)$$

$$\left\{\frac{r_c}{r_c-1} - \frac{1}{\gamma(r_c-1)}\left[\left(\frac{P_e}{MAP}\right) + (\gamma-1)\right]\right\}$$

where

M=molecular weight of the mixture
$M_a$=molecular weight of air
MAP=manifold air pressure
$P_a$=atmospheric pressure
Tha=intake air temperature
Ta=atmospheric air temperature
F/A=fuel-air ratio=1/A/F
$r_c$=engine compression ratio
$P_e$=exhaust pressure
$\gamma$=ratio of specific heat at constant pressure and specific heat at constant volume
Alternatively, PWsdt can be estimated by the following empirical relationship:

$$PWsd_t = aMAP + b\ Ne + c \quad (16)$$

where coefficients a, b, and c are determined experimentally.

Figure 6:
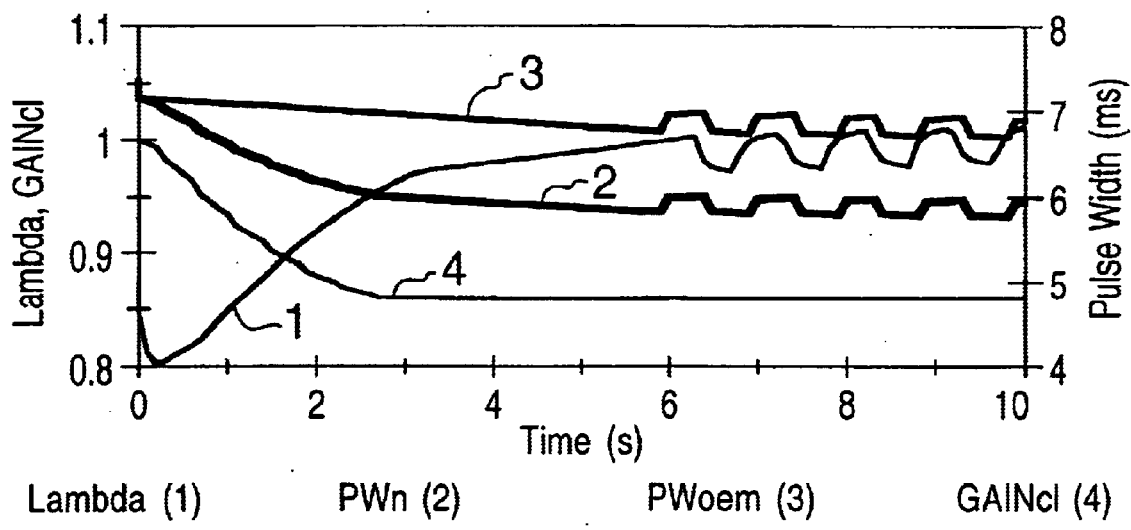
FIG. 6 shows NCS outputs (lambda, closed-loop gain and pulse width) to the UEGO in the closed-loop status of the PCM in training at idle at a coolant temperature Thw of 90° C.
Figure 7:
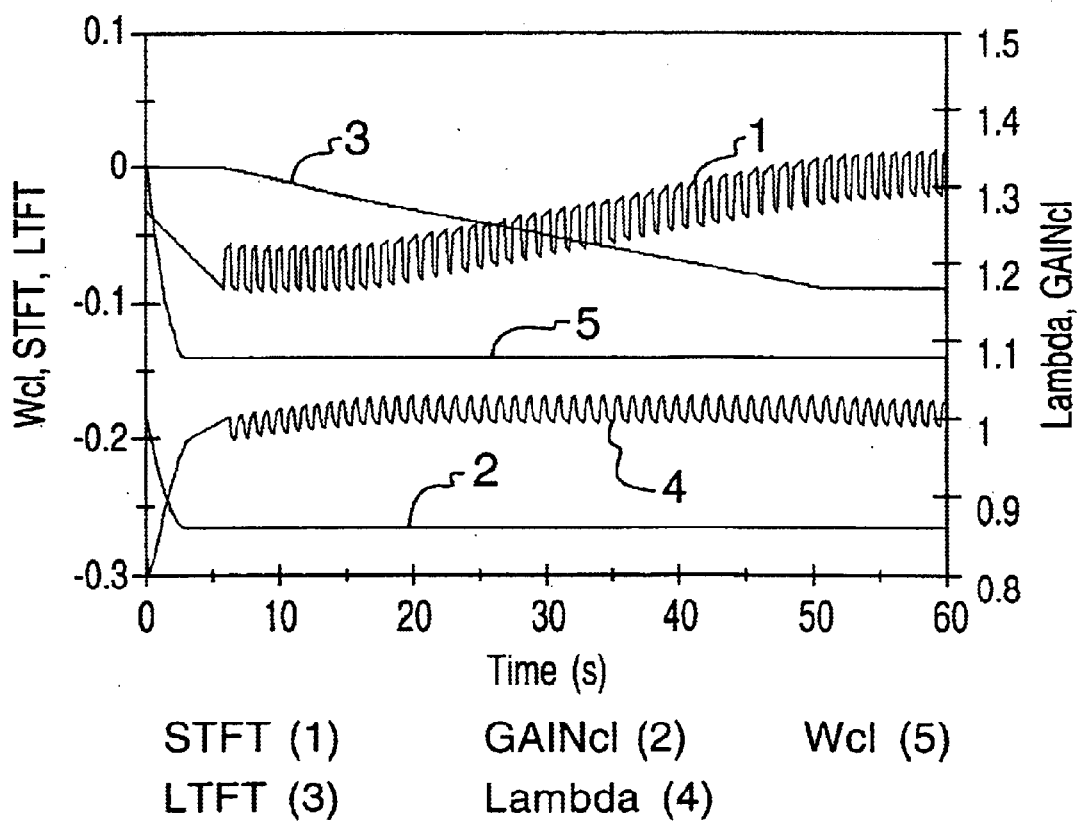
FIG. 7 shows NCS outputs (fuel trims, lambda and closed-loop gain) to the UEGO in the closed-loop status of the PCM in training at idle at a coolant temperature Thw of 90° C.

A computer model of the NCS and internal combustion engine has been developed to evaluate and test the NCS shown in FIG. 5. The objective is for the NCS to adjust lambda ($\lambda$) to the desired response ($\lambda_s$=1) while preventing the STFT and LTFT values from saturating. Model predictions are shown in FIGS. 6 and 7 where each curve is designated by numerals 1 to 5 with legends provided in the drawing. At engine idle (Ne=800 rpm, MAP=250 mmHg, Poth=12°) when the PCM 140 is in the closed-loop status (cl) at a coolant temperature Thw of 90° C. As shown in FIG. 6, the NCS output, GAINcl, reduces from 1 to 0.86. This reduces PWn from an initial value of 7.1 (ms) to 5.9 (ms) over a period of 5 (s), as shown in FIG. 6. During the same period, lambda ($\lambda$) increases from 0.8 to 1.0, and the PCM 140 creates a limit cycle in lambda ($\lambda$) at the 6 (s) mark which optimizes the catalyst efficiency, reducing tailpipe emissions. The results shown in FIG. 7 indicate that the training weight, Wcl, decreases from 0 to −0.14, and that the STFT starts to toggle at an average value of −0.077 at 6 (s). It then increases to an average value of 0, while the LTFT moves from 0 to −0.09. Hence, the STFT and the LTFT do not saturate, which would occur at values of ±0.35 in many vehicles. As mentioned earlier, saturation can cause engine trouble codes and check-engine lights.

Figure 8:
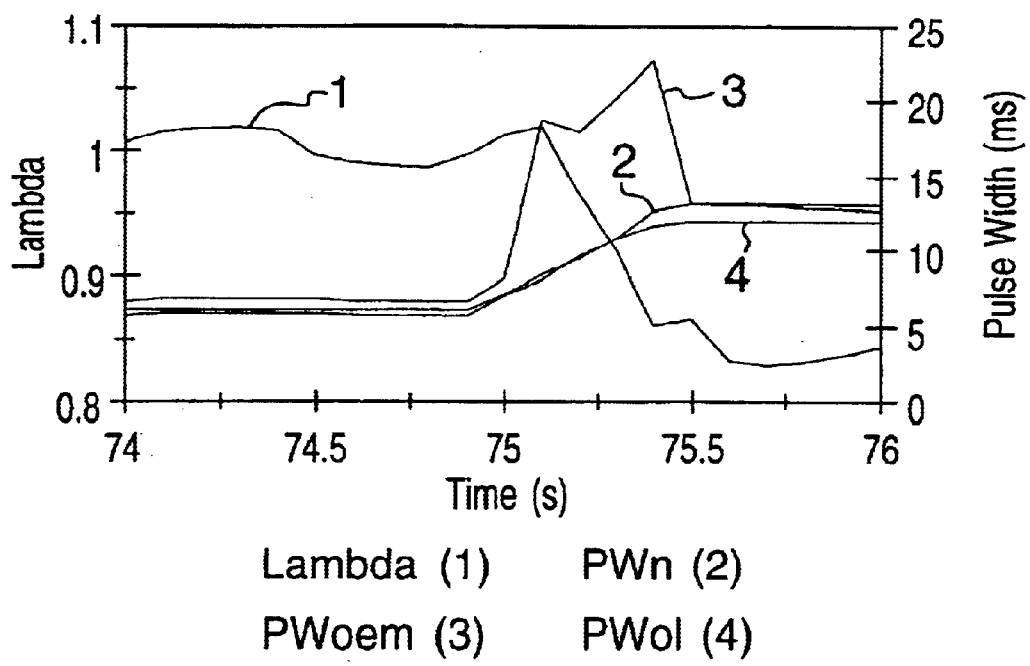
FIG. 8 shows NCS output responses (lambda and pulse with) to the acceleration from the idle conditions at a coolant temperature Thw of 90° C.

FIG. 8 shows the pulse width response to acceleration from the idle conditions, mentioned earlier, to cruise (engine speed=2000 rpm, MAP=400 mmHg, Poth=300) in 0.5 (s). A spike occurs in PWoem (curve 3) due to gasoline acceleration enrichment strategies on the PCM, peaking at 23 (ms). However, since the NCS limits PWn to 1.3 PWol, this reduces the pulse width PWn to 13 (ms), and consequently a spike in lambda (curve 1) is reduced to an acceptable value of 0.85 between the 75 and 75.5 (s).

Figure 9:
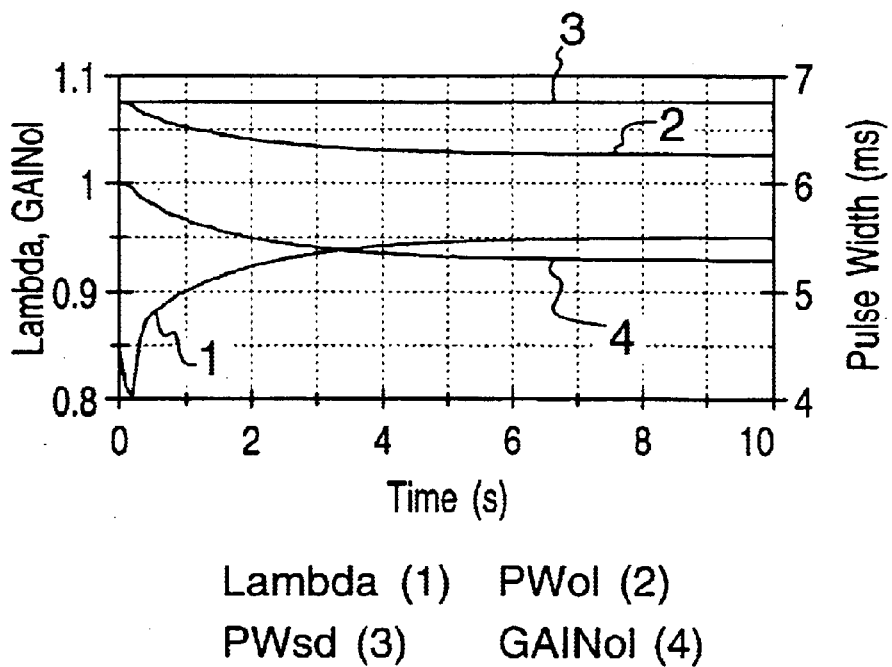
FIG. 9 shows NCS outputs (lambda, open-loop gain and pulse width) with the UEGO in the open-loop status of the PCM in training at idle at a coolant temperature Thw of −10° C.

In many vehicles at coolant temperatures Thw below 0° C., the PCM is open-loop. Training the NCS at −10° C. under the same idle conditions mentioned earlier is shown in FIG. 9. Under these circumstances PWol is initially set to PWsd=6.7 (ms). The NCS controller output, GAINol, decreases from 1 to 0.92, reducing PWol from 6.7 (ms) to 6.2 (ms). Concurrently, lambda increases from 0.8 to 0.95 when training is stopped because the 0.05 (5%) error criteria in met. Both the STFT and LTFT are zero because the PCM 140 is in the open-loop status. They are only applied in the closed-loop operation.

EXAMPLE

Figure 10:
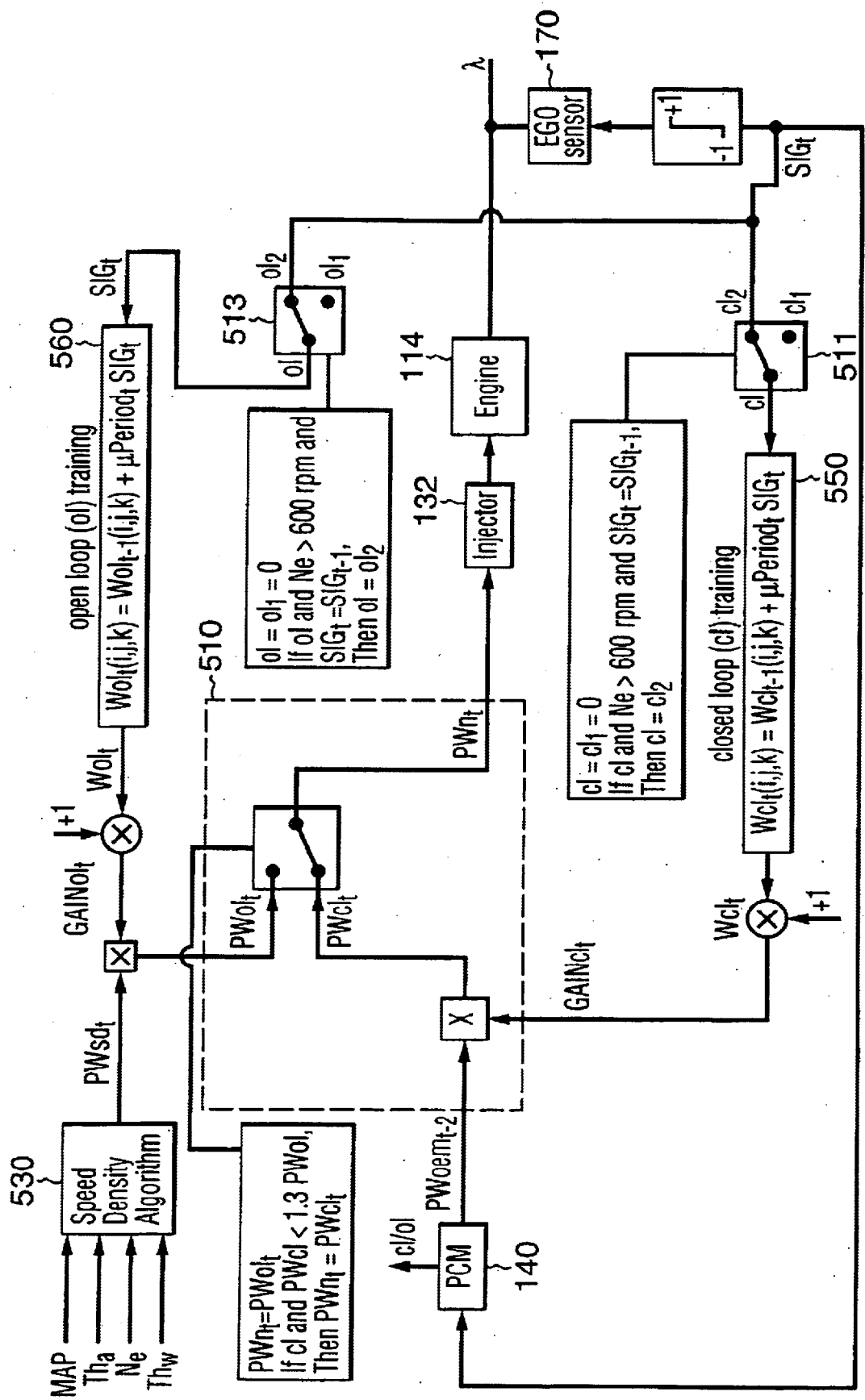
FIG. 10 is a block diagram showing a detailed configuration of the NCS utilizing an EGO sensor output for training when the PCM is in an open-loop or a closed-loop condition.

FIG. 10 shows an example of a NCS according to an exemplary embodiment of the present invention. This example is similar to the above example, except that the sensor EGO 170 (for a bang—bang signal) is used to train the neural network instead of the UEGO sensor 172 (linear signal). Similar to training with the UEGO sensor 172, open-loop training can be continuous, but closed-loop training cannot be continuous because the fuel trims will saturate if the bang—bang signal is even slightly unbalanced.

However, if continuous training is troublesome, open-loop and closed-loop training can be terminated in two ways:

(i) In a first example of termination, training will be terminated if the EGO, once it is active, changes its status from rich (+1:>0.5 volt) to lean (−1:<0.5 volt) or vise versus. At this point the new error signal is not equal to the error signal at the previous time increment ($SIG_t \neq SIG_{t-1}$). Similar to the first example for open-loop training, the engine speed Ne must be greater than 600 rpm for training to take place and the EGO must be active. Regarding the closed-loop training, training will take place if the PCM 140 is in the closed-loop status cl and if the engine speed Ne is greater than 600 rpm and if $SIG_t$ is equal to $SIG_{t-1}$.

(ii) In a second example of termination, training will be terminated if the frequency, f, of the air-fuel ratio limit cycle is less than the theorectical frequency, $f_{th}$, of the limit cycle expressed by the following equation:

$$f_{th} = \frac{1}{4T} \tag{17}$$

where

T=the transport delay between the fuel injectors and the EGO sensor 170.

Figure 11:
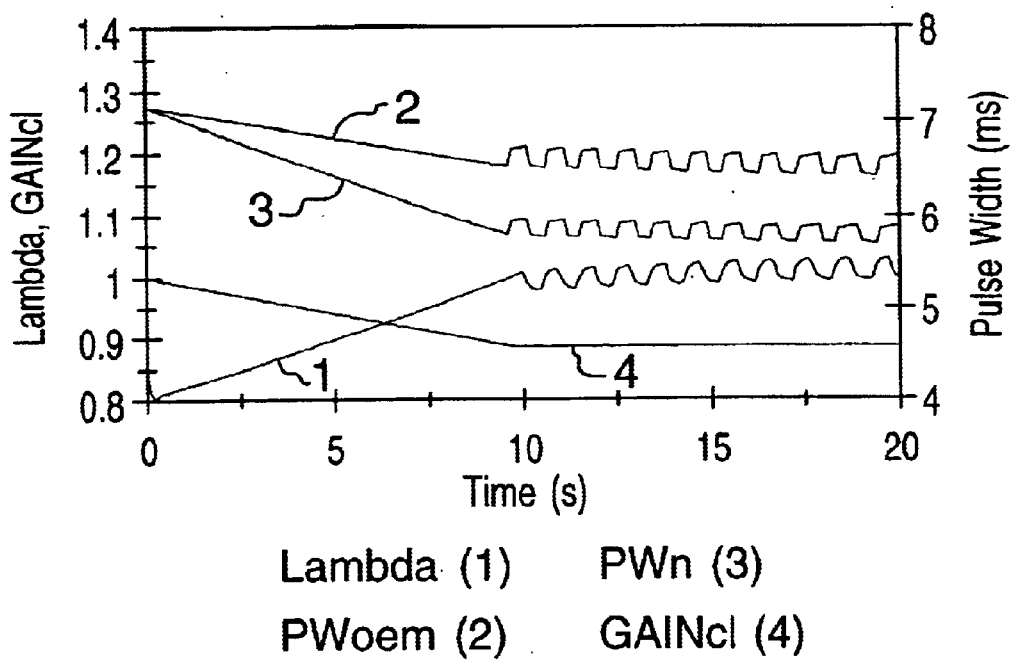
FIG. 11 shows NCS outputs (lambda, closed-loop gain and pulse width) with the EGO at the closed-loop status of the PCM in training at idle at a coolant temperature Thw of 90° C.
Figure 12:
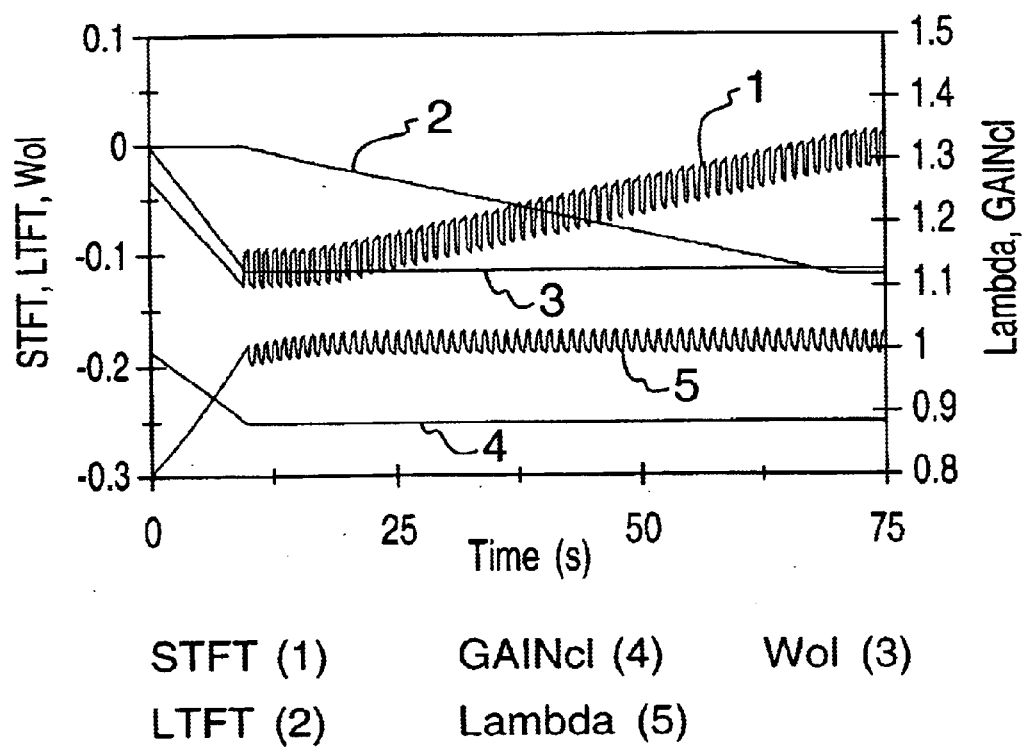
FIG. 12 shows NCS output responses (fuel trims, weight, lambda and close-loop gain) to the EGO in the closed-loop status of the PCM in training at idle at a coolant temperature Thw of 90° C.

FIG. 11 shows the NCS output, GAIncl, at idle and Thw=90° C. while the PCM 140 is in the closed-loop status cl. Similar to training with the UEGO, GAIncl decreases from 1.0 to 0.89, reducing PWn initially from 7.2 (ms) to 5.9 (ms) over a 10 (s) period. At the same time, lambda (λ) increases from 0.8 to about 1.0 where it starts to oscillate in a limit cycle between 0.98 and 1.02 after the 10 (s) mark. At this point, training is stopped because $SIG_T \neq SIG_{t-1}$. As shown in FIG. 12, the STFT initially decreases to an average value of −0.11 at 10 (s), then increases to oscillate (toggle) about zero at 72 (s). Concurrently, Wol decreases to −0.11 as well at 10 (s), and the LTFT decreases from 0 to −0.12 after 72 (s). Since LTFT is less than ±0.35, saturation does not occur, and the engine will perform acceptably well without illuminating a check engine light.

Figure 13:
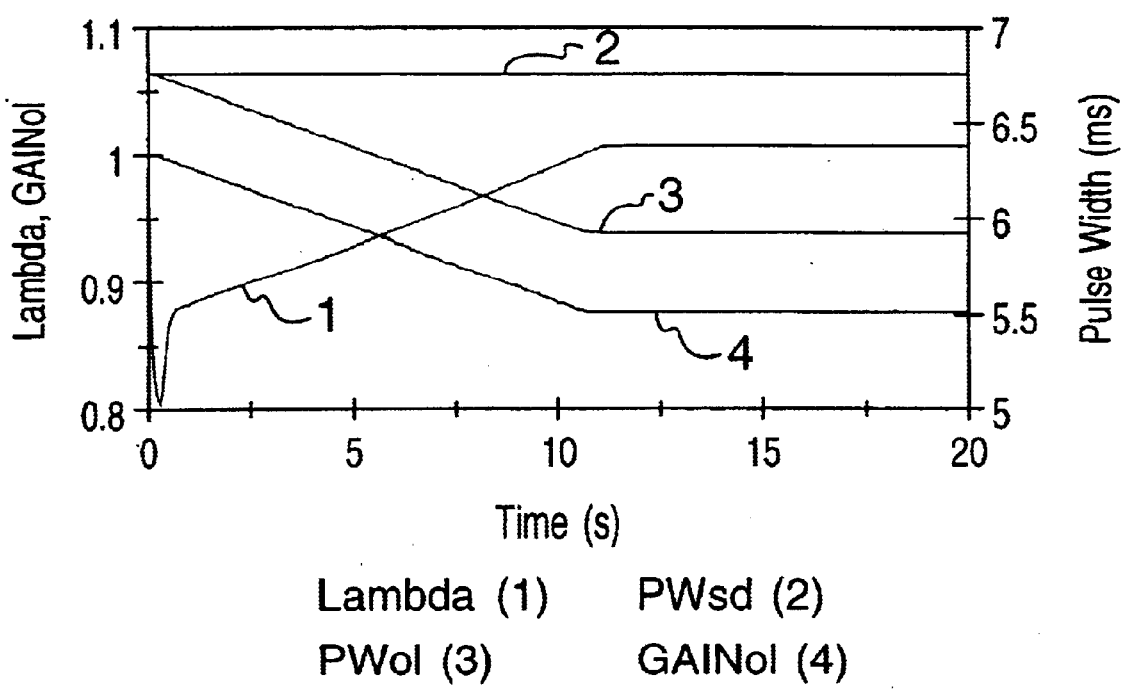
FIG. 13 shows NCS outputs (lambda, open-loop gain and pulse width) in the open-loop status of the PCM in training at idle at a coolant temperature Thw of −10° C.

Training with the EGO at idle at a coolant temperature of −10° C. and when the PCM is in the open-loop status (ol) and EGO is active is shown in FIG. 13. Similar to training with the UEGO, the NCS controller output, GAInol, decreases from 1.0 to 0.87, reducing PWol initially from 6.7 (ms) to 5.9 (ms) at 10 (s). Concurrently, lambda (λ) increases from 0.8 to 1.01, as which point training is stopped.

EXAMPLE

Figure 14:
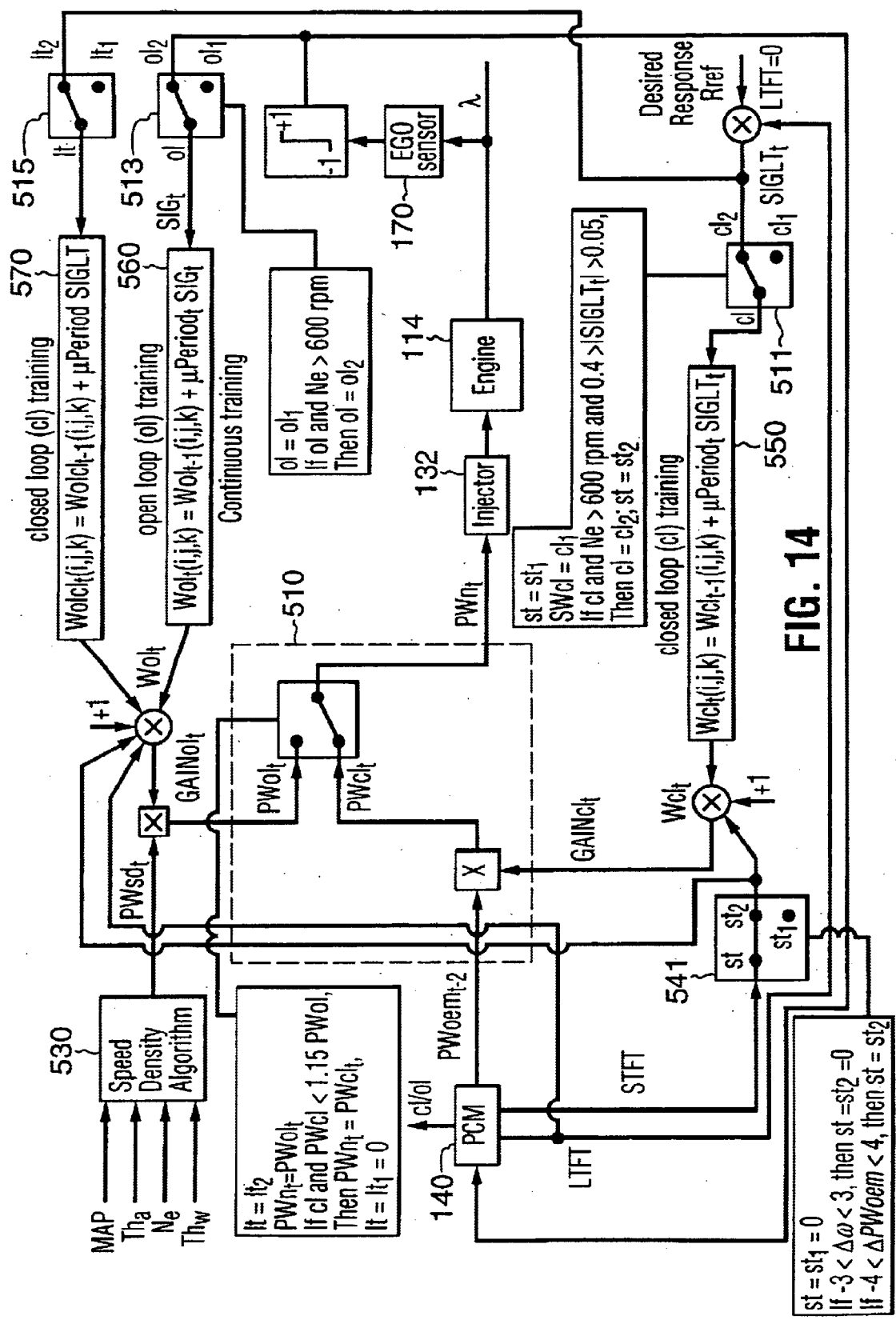
FIG. 14 is a block diagram showing a detailed configuration of the NCS utilizing short-term and long-term fuel trims (STFT, LTFT) for training when the PCM is in a closed-loop.

FIG. 14 shows an example of the NCS according to an exemplary embodiment of the present invention. In the third example, the LTFT is used to train the NCS when the PCM 140 is in the closed-loop status (cl) (instead of training utilizing the UEGO or the EGO as in the first and second examples), as follows:

$PWcl_t$ is calculated from the following relationships at time t, the time that the $PWoem_t$ event takes place (similar to Equation 1):

$$PWcl_t = GAINcl_t PWoem_{t-2} \tag{18}$$

The output of the closed-loop neural controller, $GAINcl_t$, is calculated from the training weight, $Wcl_{t-1}(i, j, k)$, as follows:

$$GAINcl_t = 1 + Wcl_t(i, j, k) + STFT \tag{19}$$

$Wcl_{t-1}(i, j, k)$ is a thee-dimensional array of weights with the following coordinates: i=coolant temperature (Thw); j=manifold air pressure (MAP) or manifold air flow (MAF); k=engine speed (Ne).

$PWol_t$ is calculated from the following relationships at time t:

$$PWOl_t = GAINol_t PWsd_t \tag{20}$$

If the PCM is closed loop, but PWcl>1.15 PWol:

$$GAINol_t = 1 + Wol_t(i, j, k) + Wolcl_t(i, j, k) + STFT + LTFT \tag{21}$$

For this example the factor between PWcl and PWol has been reduced from 1.3 to 1.15 to improve response.

The training processes are similar to those used in the previous examples (Equations 7 and 8); however, the closed-loop desired response Rref is LTFT=0. Hence, the training error, $SIGLT_t = 0 + LTFT$. However, $Wolcl_t(i, j, k)$ is calculated as follows:

$$Wolcl_t(i, j, k) = Wolcl_{t-1}(i, j, k) + \mu Period_t SIG_t \tag{22}$$

Training Wolcl will take place if the PCM 140 is in the closed-loop status (cl) and if the engine speed Ne is greater than 600 rpm and if the absolute value of $SIGLT_t$ is greater than 0.05 or less than 0.4. The STFT signal from the PCM 140 is used to improve response.

Switch 515 is used to stop training if cl and PWcl>1.15 PWol as follows:

$lt = lt_2$

If cl and PWcl<1.15 PWol then $lt = lt_1 = 0$

In the present example, a fuel trim section switch 541 is included for selecting the STFT to avoid changes in enrichment (spikes) during transients that in some cases are included in STFT. Switch 541 is open ($st = st_1 = 0$) during significant transients in PWoem or rpm; however, if there is only small change in PWoem or rpm switch 541 closes ($st = st_2$) as follows for the sampling interval of Δω and ΔPWoem:

$st = st_1 = 0$

If $-3 < \Delta\omega < 3$ then $st = st_2$

If $-4 < \Delta PWoem < 4$ then $st = st_2$ where ω=injection frequency=1/Period Δω=the change frequency during the sampling interval, and ΔPWoem=the change in pulse width during the sampling interval.

In the present example, the open-loop training can be conducted in the same manner as in either of the previous examples. FIG. 14 shows that the EGO sensor 170 is used for continuous open-loop training as in the second example if the EGO is active.

Figure 15:
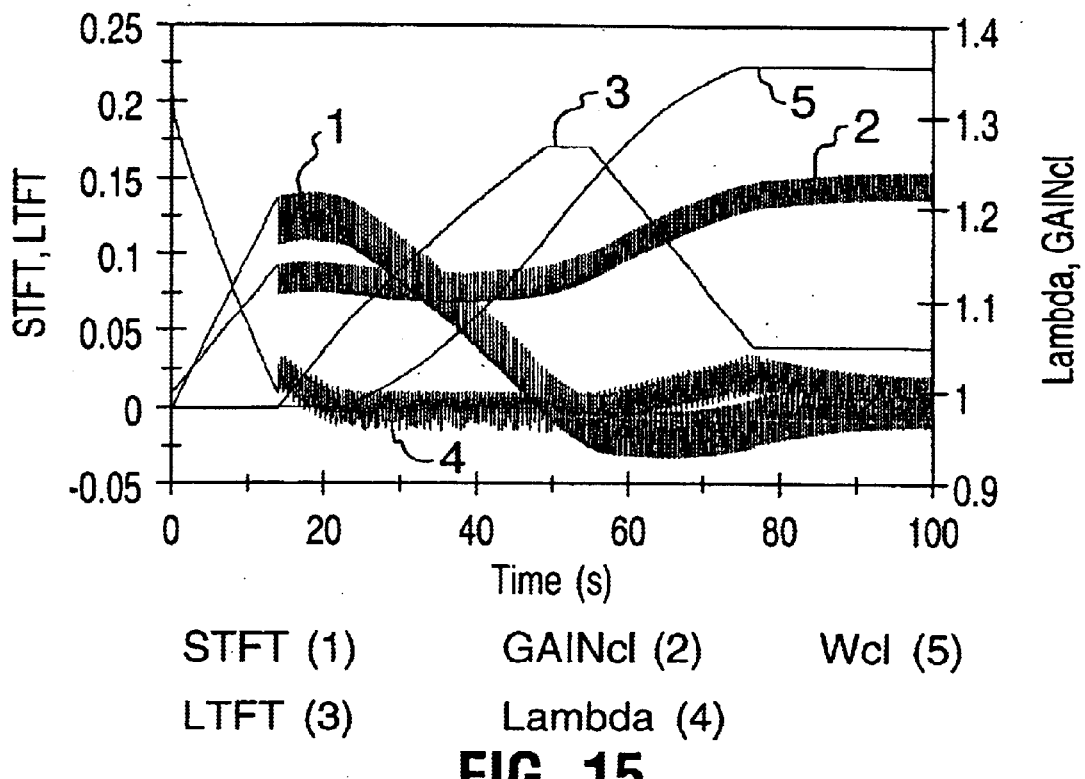
FIG. 15 illustrates NCS output responses (fuel trims, lambda and closed-loop gain) to training utilizing the STFT and LTFT in the closed-loop status of the PCM if PWcl<1.15 PWol at a coolant temperature Thw of 90° C.

FIG. 15 shows the model predictions for Wcl training at cruise (engine speed=2000 rpm, MAP=400 in Hg, Poth=30°) and a coolant temperature Thw of 90° C. utilizing the STFT for fast response and the LTFT for closed-loop training. Unlike the previous examples, the initial condition is a lean air-fuel ratio of lambda λ=1.3 (instead of rich). The NCS output, GAIncl, initially increases from 1 to 1.12 over 13 (s) in the first step due largely to the STFT feed back, then increases from 1.12 to 1.22 at 85 (s) in the second step due to LTFT training. Wcl increases from zero at 20 (s) to 0.23 at 75 (s). If a significant change in engine speed (rpm) or pulse width (PWoem) occurs then STFT is disconnected at switch 541.

In the first step, the LTFT increases to 0.17, then in the second step it reduces to 0.04 until training is stopped at 75 (s). The examples presented earlier limit the LTFT to some value; however, the present example is unique because it reduces the LTFT to near zero (0.04), a definite improvement. Concurrently, the STFT feed back to the NCS reduces lambda (λ) from 1.3 to toggling about 1 in about 12 (s). Subsequently, the combination of the LTFT and Wcl reduce the STFT to a limit cycle about zero.

Figure 16:
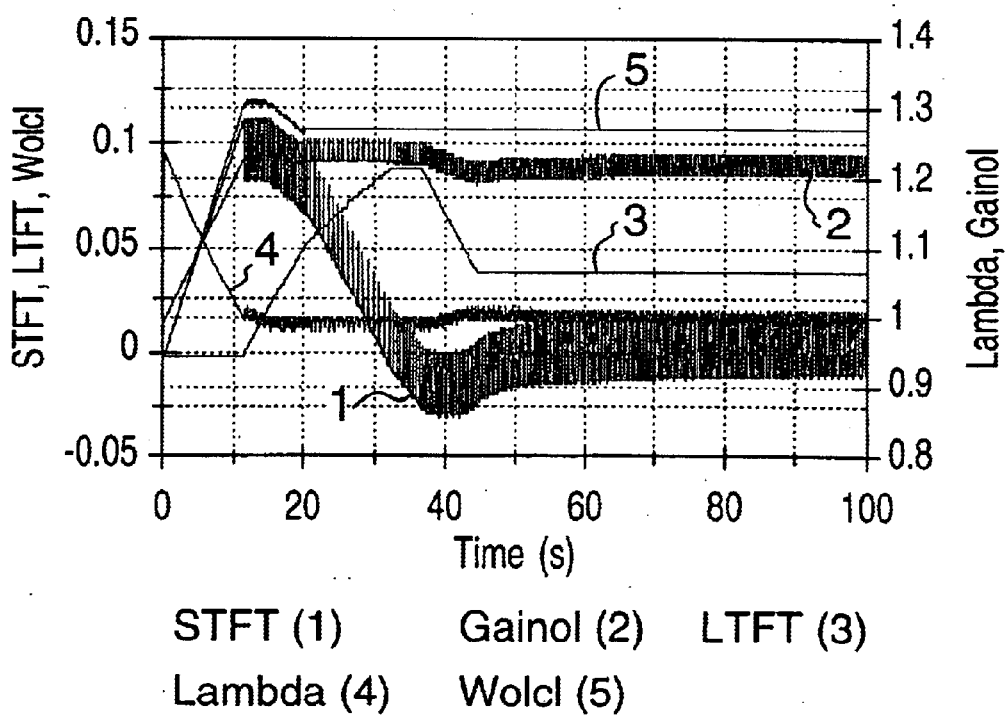
FIG. 16 illustrates NCS output responses (fuel trims, lambda and open-loop gain) to training utilizing the STFT and LTFT in the closed-loop status of the PCM if PWcl >1.15 PWol at a coolant temperature Thw of 90° C.

FIG. 16 shows the model predictions for Wolcl training at cruise (engine speed=2000 rpm, MAP=400 in Hg, Poth=

30°) and a coolant temperature Thw of 90° C. STFT is used for fast response and the LTFT for closed-loop training. For this case PWcl>1.15 PWol; hence PWn=PWol, although the PCM is closed loop. The initial condition is a lean air-fuel ratio of lambda λ=1.23. The NCS output, GAINol, increases from 1 to 1.23 over 13 (s) largely due to the STFT feed back. Wolcl increases from zero at 0 (s) to 0.12 at 12 (s). If a significant change in engine speed (rpm) or pulse width (PWoem) occurs, then STFT is disconnected at switch 541.

In the first step, LTFT increases to 0.08, then in the second step it reduces to 0.04 until training is stopped at 45 (s). Similar to above, LTFT is reduced to near zero (0.04), a definite improvement. Concurrently, the STFT feed back to the NCS reduces lambda (λ) from 1.23 to toggling, or limit cycle, about 1 in about 12 (s). Subsequently, the combination of the LTFT and Wolcl reduce the STFT to a limit cycle of ideally about zero (i.e., the desired condition).

EXAMPLE

Figure 17:
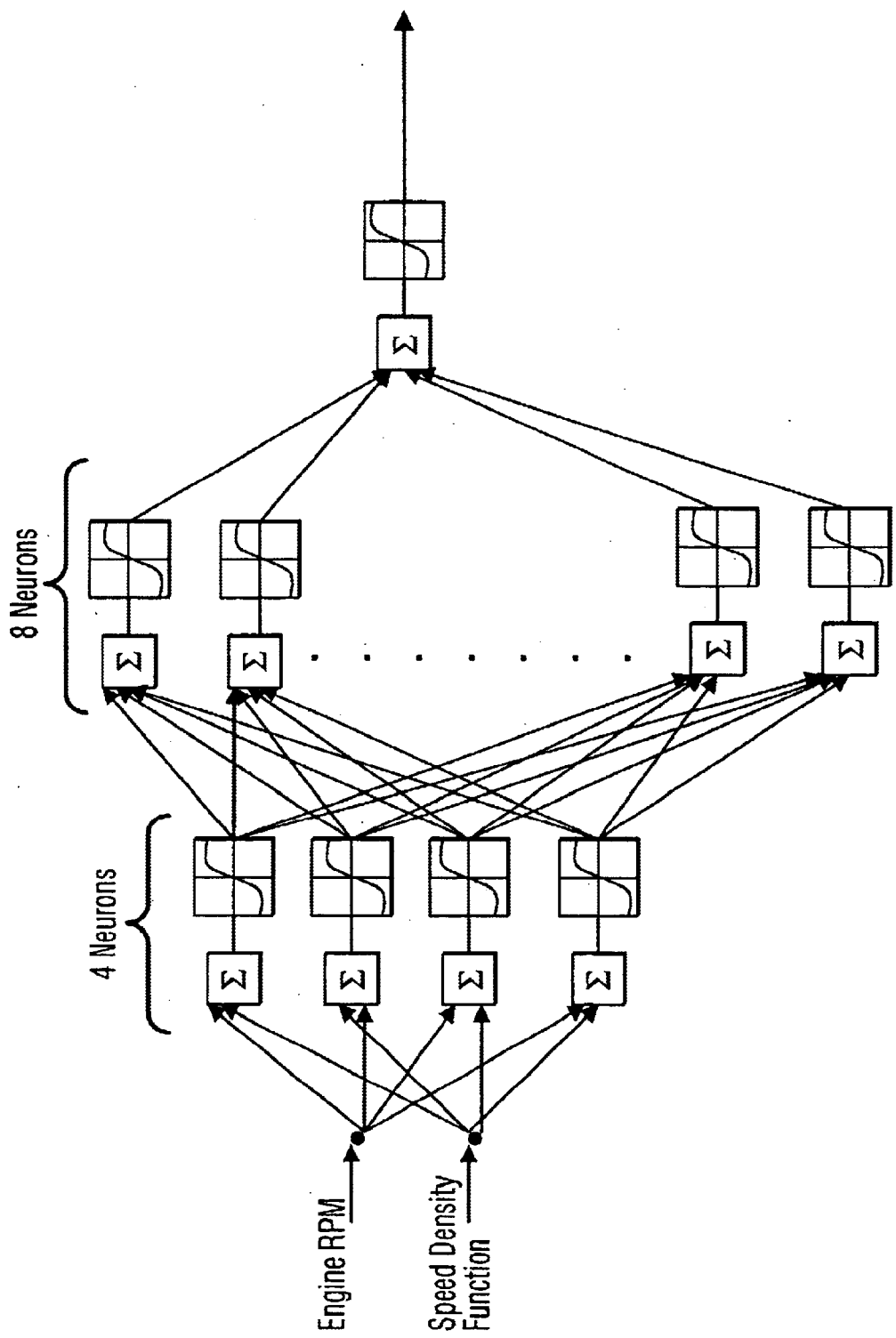
FIG. 17 illustrates a three-layered neural network used in neural control system.

FIG. 17 illustrates an example of a three layered neural network with tan-sigmoid activation functions according to an exemplary embodiment of the present invention. Four and eight neurons are respectively used in the first and the second layers. The output layer has one neuron. Based on sensitivity studies with various inputs, two inputs are selected as inputs to the neural network. The inputs sent to the neural network are engine speed, Ne, oxygen sensor output, UEGO, speed density function pulse width, PWsd, and output of the neural networks with a unit delay, which makes the network dynamic.

The learning algorithm used to train the neural network is computationally efficient and is known as the Alopex algorithm. The Alopex learning algorithm adapts the neural network weights directly based on the output error E, of the system and does not use a transformed version of the error, which is normally done in other neural network based control schemes.

$$E = y_d(t) - y(t) \quad (23)$$

where yd and y are the desired and the actual output.

Each weight, w, in the network is changed based on a probability index P of going in the right direction, so that the global error function is minimized. During an $t^{th}$ iteration in time, the weight change is given as, $$w(t) = w(t-1) + \delta(t) \quad (24)$$

where $\delta(t)$ is a small positive or negative step of size δ with the following probabilities:

$\delta(t) = -\delta$ with probability P(t)
$= +\delta$ with probability [1−P(t)]
The probability is given by:

$$P(t) = 1/(1 + \exp[-\Delta(t)/T]) \quad (25)$$

where $\Delta w(t) = w(t-1) - w(t-2)$ and $\Delta E(t) = E(t-1) - E(t-2)$ are the changes in weight and error measure over the previous two iterations and Δ(n) is a correlation measure A between the change in weight and change in system error and Δ(n) is given by:

$$\Delta(t) = \Delta w(t) \Delta E(t) \quad (26)$$

The algorithm takes biased random walks in the direction of decreasing error, measured over the previous two iterations. The weights of the network are initialized at small random values and are updated at each time step (incremental updating). The temperature T is a positive temperature that determines the effective randomness in the system. Initially, T is set to a large value and subsequently, is set equal to the average value of the correlation calculated at every 50 iterations. This method automatically reduces the temperature T when parameters are close to optima where the correlations are small.

EXAMPLE

Figure 18:
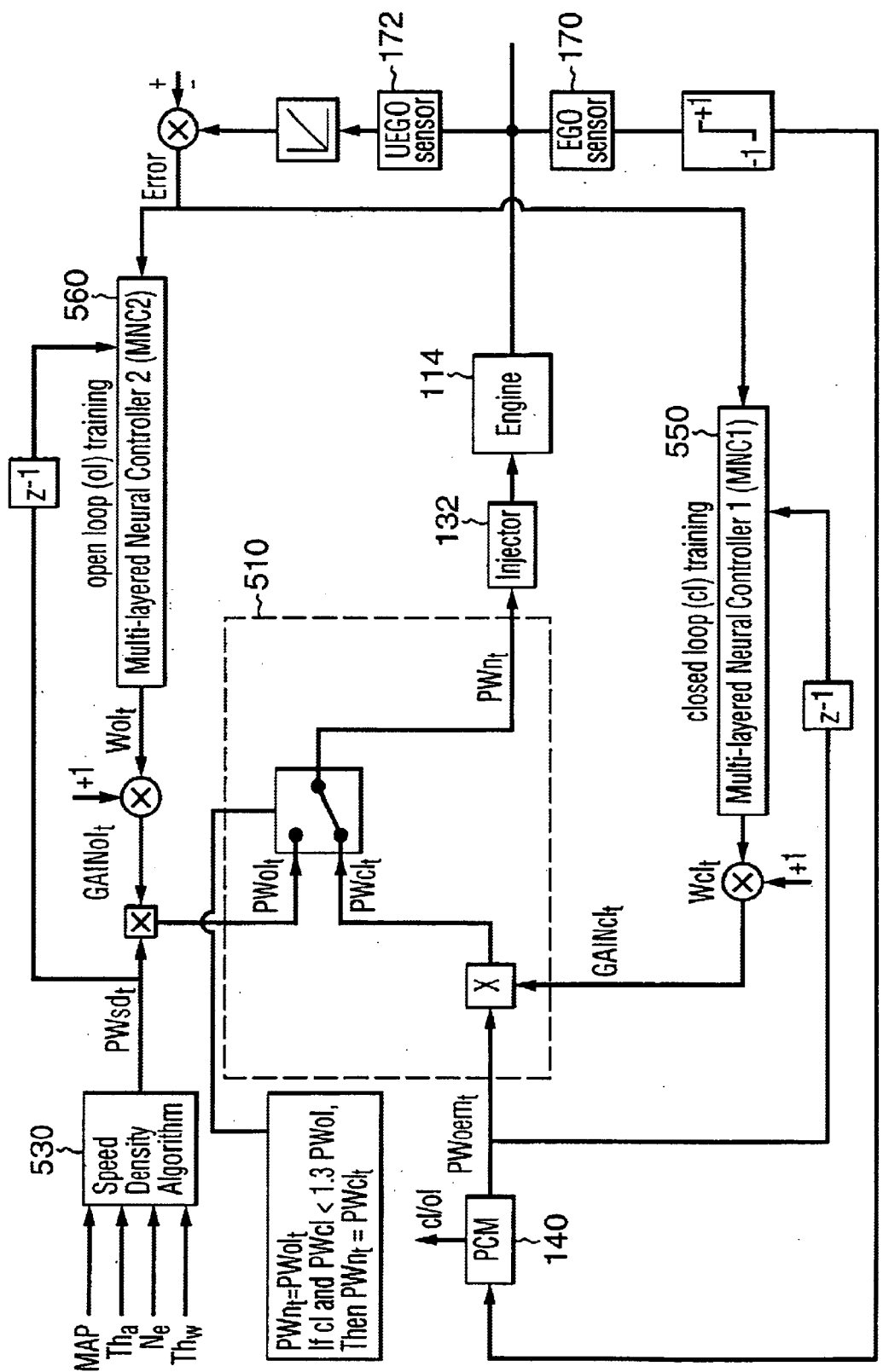
FIG. 18 is a block diagram showing a detailed configuration of the NCS utilizing a UEGO sensor output for training with two neural controllers.

FIG. 18 shows an example of the NCS according to an exemplary embodiment of the present invention. In the present example, two controllers are used: a first multi-layered neural controller 1 (MNC1) 550 and a second multi-layered neural controller 2 (MNC2) 560 that are used when the PCM 140 is in the closed-loop and open-loop, respectively. The training for the controllers is on-line and is continuously performed. The objective for the MNC1 550 in closed-loop operation is to modify the gasoline pulse width, PWoem, adjusting lambda (λ) to the desired value (λ=1), while preventing the short-term (STFT) and long-term (LTFT) from saturating on the PCM. The objective for the MNC2 560 in open-loop operation is to modify the pulse width from the pulse with calculator 530 having a speed-density process/algorithm to ensure the relative air/fuel ratio is near stoichiometric while PCM 140 is in open-loop. The MAP and UEGO values sensed by the MAP sensor 174 and the UEGO sensor 172 are used for control, which can be described in detail as follows:

(i) In a case of the PCM 140 being in the closed-loop and PWcl<1.3PWsd:

$$PWn_t = PWcl_t \quad (27)$$

$$PWcl_t = PWoem_t \times GAINcl_t \quad (28)$$

$$GAINcl_t = 1 + Wcl_t \quad (29)$$

$$Wcl_t = \Psi[.] \quad (30)$$

where
PWn=natural gas pulse width (ms)
PWcl=modified gasoline pulse width (ms) from the PCM 140
PWoem=gasoline pulse width (ms) from the PCM 140
GAINcl=closed-loop gain
Wcl=output of neural controller 550
Ψ[.]=nonlinear activation of neural controller (ii) In a case of the PCM 140 being in the open-loop:

$$PWn_t = PWol_t \quad (31)$$

$$Pwol_t = PWsd_t \times GAINol_t \quad (32)$$

$$GAINol_t = 1 + Wol_t \quad (33)$$

$$PWsd_t = aMAP + bNe + c \quad (34)$$

PWsd can also be calculated utilizing Equation 16.
where
PWol=modified standard speed density natural gas pulse width (ms)
PWsd=standard speed density natural gas pulse width (ms)
MAP=manifold air pressure (mm Hg)
Ne=engine speed (rpm)
a,b,c=three coefficients which are determined experimentally GAINol=open-loop gain
Wol=output of neural controller 560
(iii) In a case of the PCM 140 being in the closed-loop and PWcl>1.3PWsd:

$$PWn_t = PWol_t \tag{36}$$

Two training algorithms will be explained after showing the structure of neural network controller: i) modified back propagation, and 2) modified Alopex.

Figure 19:
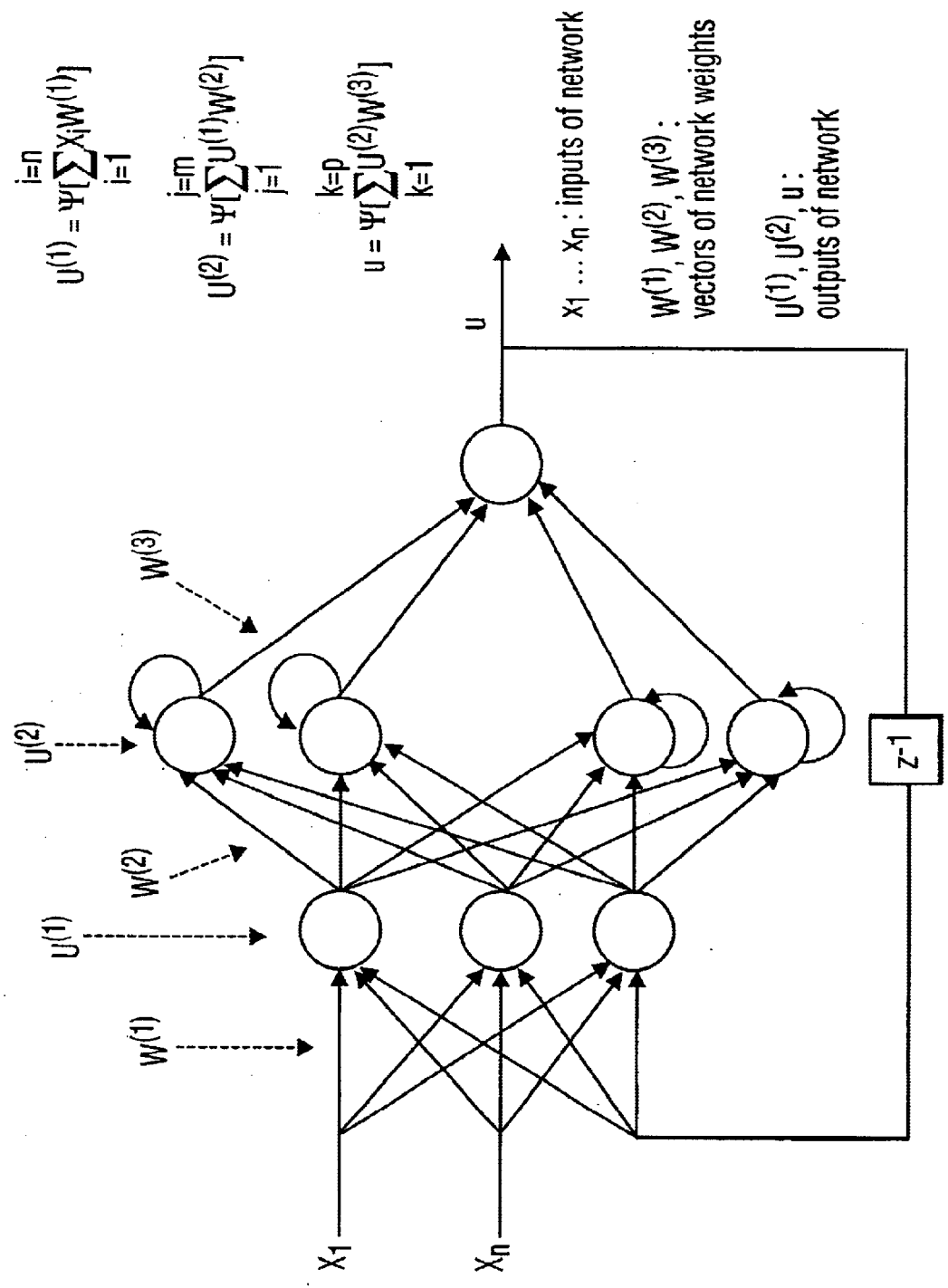
FIG. 19 illustrates a neural controller.
Figure 20:
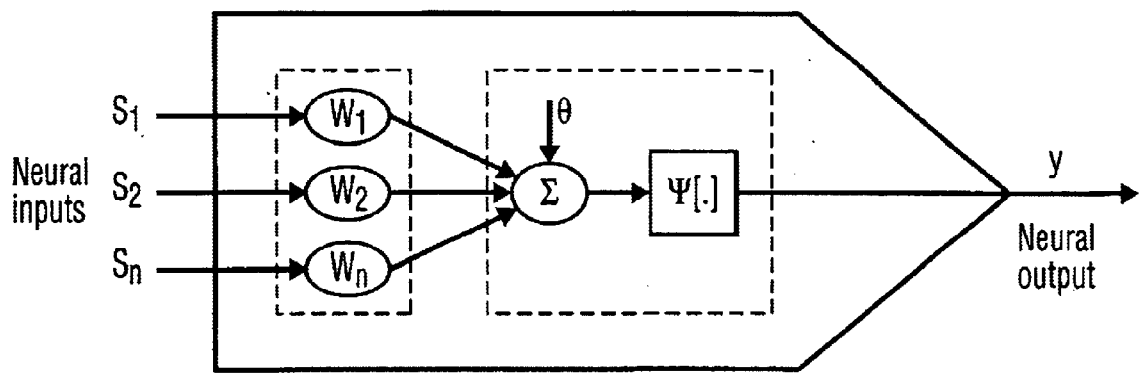
FIG. 20 illustrates the structure of the neuron.

A neural-network-based controller can be considered as a general class of adaptive controller. The basic feature of a neural controller is the ability to learn and adapt. The structure of the neural controller used in the present example is a three-layered neural network with one feedback connection within the network as shown in FIG. 19. Each computing element in the network is called a neuron, and its mathematical model is shown in FIG. 20.

Figure 21:
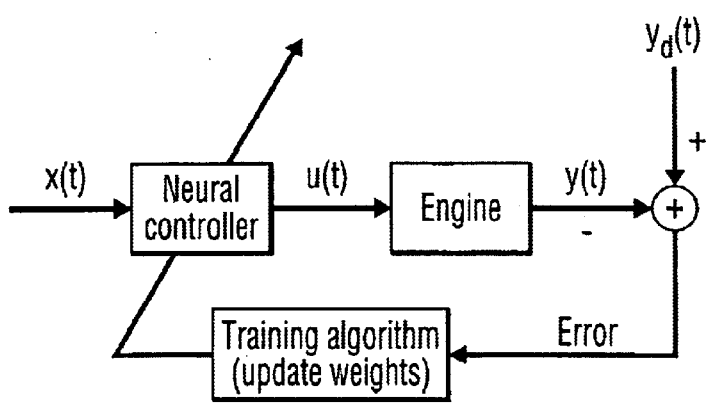
FIG. 21 illustrates training process.

The basic training (learning) process for a neural controller is demonstrated in FIG. 21 (similar to FIG. 2), where x(t) is the input signal, u(t) is the output signal from the controller, y(t) and yd(t) are the actual and desired system output. The error signal is defined as:

$$e(t) = y_d(t) - y(t) \tag{37}$$

The error signal is used to adapt the neuron weights (WT) so as to minimize the performance index J(t) which is defined as:

$$J(t) = E\{F[e(t, WT)]\}$$

A commonly used form of F[.] is a squared function of error, then $$J(t) = \frac{1}{2} E\{e^2(t)\} = \frac{1}{2} \frac{1}{N} \sum_{m=t-N+1}^{t} [e^2(m)] \tag{38}$$

Where N is the number that indicates the amount of past information used in the calculation of J(t).

The updated (adaptation) equations for the adjustable neural weights are defined as:

$$WT_{1j}(t+1) = WT_{1j}(t) + \Delta WT_{1j}(t) \tag{39}$$

There are different training processes/algorithms associated with the updating of neural weights.

Two processes are discussed: modified error back propagation (backward substitution) (MBP) and modified Alopex (MAL).

(i) Modified Back Propagation

The back propagation algorithm is a gradient decedent method that minimizes the error between the desired outputs and the actual outputs of the networks, and the error is back propagated layer by layer and used to update the weights of the networks. The derivation of MBP algorithm is based on the back propagation method. Using the steep decent approach, the adjustments in the weights are given by:

$$\Delta WT_{ij}(t) = -\mu \frac{\partial J(t)}{\partial WT_{ij}} \tag{40}$$

Where $\mu$ is the learning rate which determines the rate of convergence of the learning algorithm.

Equation (40) can be written in detail, as follows:

$$\Delta WT_{ij}(t) = -\mu \frac{\partial}{\partial WT_{ij}} \left[ \frac{1}{2} \frac{1}{N} \sum_{m=t-N+1}^{t} e^2(m) \right] \tag{41}$$

$$= -\mu \frac{1}{N} \sum_{m=t-N+1}^{t} e(m) \left[ \frac{\partial}{\partial WT_{ij}} e(m) \right]$$

$$= -\mu \frac{1}{N} \sum_{m=t-N+1}^{t} e(m) \frac{\partial}{\partial WT_{ij}(m)} [y_d(t) - y(t)]$$

$$= \mu \frac{1}{N} \sum_{m=t-N+1}^{t} e(m) \frac{\partial}{\partial WT_{ij}(m)} y(t)$$

$$= \mu \frac{1}{N} \sum_{m=t-N+1}^{t} e(m) \frac{\partial y(t)}{\partial u(t)} \frac{\partial u(t)}{\partial WT_{ij}(t)}$$

up to now, a basic MBP algorithm is provided.

(ii) Modified Alopex

Refer to the Alopex algorithm discussed earlier, Equation (24) can be rewritten as:

$$WT_{1j}(t+1) = WT_{1j}(t) + \delta(t) \tag{42}$$

and $\delta(t) = +\delta$ when $\Delta WT$ increase and $\Delta E$ decrease, or $\Delta WT$ decrease and $\Delta E$ increase $\delta(t) = +\delta$ when $\Delta WT$ decrease and $\Delta E$ deccrease, or $\Delta WT$ increase and $\Delta E$ increase where $\delta$ is small positive size.

Figure 22:
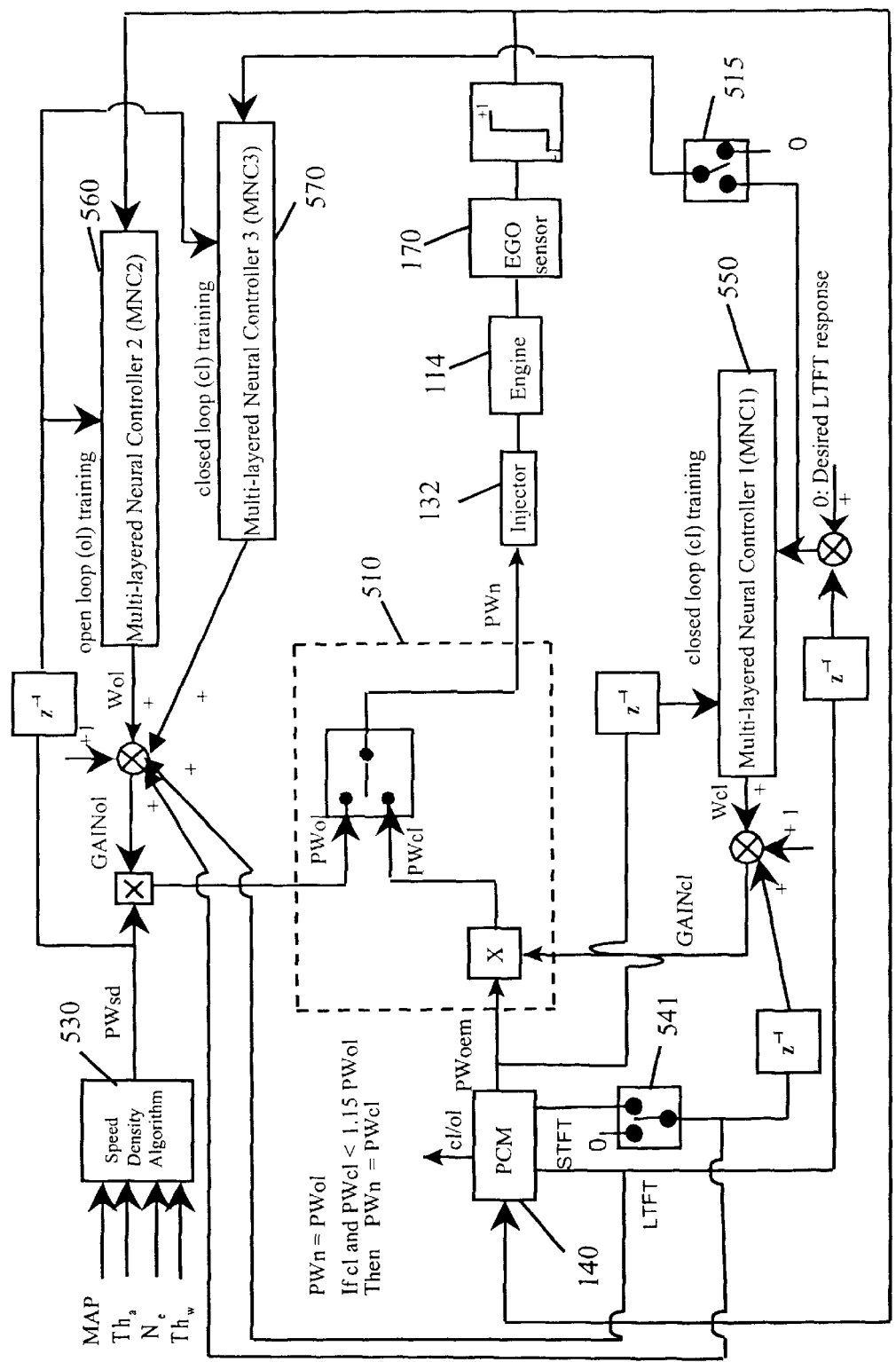
FIG. 22 is a block diagram showing a detailed configuration of the NCS utilizing fuel trim control.

A schematic of another learning strategy that uses fuel trim (STFT and LTFT) to train the neural controller when the PCM 140 is closed-loop is shown in FIG. 22. This is a case of NCS control with STFT and LTFT at an injection pressure Pj=125 psig and a coolant temperature Thw=90° C. The structure is similar to the structure in FIG. 14. The training algorithm is to make the closed-loop desired response LTFT be close to zero. The LTFT decreases with the increasing of learning iteration. The final value of LTFT is within the rage of −0.05 to +0.05.

Although particular embodiments of the present invention have been described in detail, there are numerous variations. It should be appreciated that numerous variations, modifications, and adaptations may be made without departing from the scope of the present invention as defined in the claims.

What is claimed is:

1. A method of modifying a fuel injection signal having a pulse width, the fuel injection signal being provided by a controller managing a fuel powered apparatus receiving gasoline and an alternative fuel for electrical control of a gasoline operated injector and an alternative-fuel operated injector, the controller having information on temperature, exhaust gas oxygen (EGO) content, air-fuel ratio, fuel trims and a control system type, the method comprising:

(a) receiving the pulse width of the fuel injection signal;
(b) receiving the information on the temperature, the EGO content, and the fuel trims;
(c) modifying the pulse width of the fuel injection signal based on the received information, the modified pulse width controlling alternative fuel supplied by the alternative fuel injector to the fuel powered apparatus;
(d) determining whether an error criterion is met based on measured information of the fuel powered apparatus operating on the alternative fuel and desired response information; and
(e) repeating the steps (c) and (d) when the error criterion is not met.

2. The method of claim 1, further including (a) providing the alternative fuel to the alternative fuel injector, the alternative fuel injector being configured to operate on the alternative fuel, the alternative fuel being one of: natural gas, propane, and hydrogen; and (b) providing the gasoline to the gasoline injector.

3. The method of claim 1, wherein step (d) includes:
obtaining a value of the EGO content as the measured information; and
providing a desired EGO content as the desired response information.

4. The method of claim 1, wherein step (d) includes:
obtaining a value of the air-fuel ratio as the measured information; and
providing a desired air-fuel ratio as the desired response information.

5. The method of claim 1, wherein step (c) includes:
determining a closed-loop pulse width in response to the pulse width of the fuel injection signal when the control system type is closed-loop, the closed-loop pulse width, the alternative fuel supplied by the alternative fuel injector and the determination of the error criterion being performed in response to the closed-loop pulse width.

6. The method of claim 5, further comprising adjusting the closed-loop pulse width based on speed density information of the fuel powered apparatus.

7. The method of claim 1, wherein step (c) includes:
determining an open-loop pulse width in response to the pulse width of the fuel injection signal when the control system type is open-loop, the open-loop pulse width, the alternative fuel supplied by the alternative fuel injector and the determination of the error criterion being performed in response to the open-loop pulse width.

8. The method of claim 7, further comprising adjusting the open-loop pulse width based on speed density information of the fuel powered apparatus.

9. The method of claim 1, wherein step (d) includes:
obtaining the fuel trims information as the measured information; and
providing desired fuel trims information as the desired response information.

10. The method of claim 9, wherein the step of obtaining the fuel trims information includes obtaining a measured short-term fuel trim.

11. The method of claim 9, wherein the step of obtaining the fuel trims information includes obtaining a measured long-term fuel trim.

12. The method of claim 9, wherein the step of obtaining the fuel trims information includes obtaining a measured short-term fuel trim and a measured long-term fuel trim.

13. The method of claim 12, wherein step (d) includes:
obtaining a value of the air-fuel ratio as the measured information; and
providing a desired air-fuel ratio as the desired response information.

14. The method of claim 13, wherein step (c) includes:
determining a closed-loop pulse width in response to the pulse width of the fuel injection signal when the control system is closed-loop, the closed-loop pulse width and the determination of the error criterion being performed in response to the closed-loop pulse width.

15. The method of claim 14, further comprising adjusting the closed-loop pulse width based on speed density information of the fuel powered apparatus.

16. The method of claim 15, further comprising obtaining information on temperature of the fuel powered apparatus in operation.

17. The method of claim 16, further comprising obtaining the speed density information of the fuel powered apparatus.

18. The method of claim 17, wherein step (c) includes changing the pulse width in response to the temperature information, the speed density information and the value of the air-fuel ratio.

19. A system for modifying a fuel injection signal having a pulse width, the fuel injection signal being provided by a controller managing a fuel powered apparatus receiving gasoline and an alternative fuel for electrical control of a gasoline operated injector and an alternative-fuel operated injector, the controller having information on temperature, exhaust gas oxygen (EGO) content, air-fuel ratio, fuel trims and a control system type, the system comprising:
a mechanism constructed and adapted to obtain the pulse width of the fuel injection signal;
a mechanism constructed and adapted to receive the information on the temperature, EGO content and the fuel trims;
a mechanism constructed and adapted to modify the pulse width of the fuel injection signal based on the received information, the modified pulse width controlling the alternative fuel supplied by the alternative fuel injector to the fuel powered apparatus; and
a mechanism constructed and adapted to determine whether an error criterion is met based on measured information of the fuel powered apparatus operating on the alternative fuel and desired response information.

20. The system of claim 19, wherein the mechanism to determine includes:
a mechanism constructed and adapted to obtain a value of the EGO content as the measured information and to provide a desired EGO content as the desired response information.

21. The system of claim 19, wherein the mechanism to determine includes:
a mechanism constructed and adapted to obtain a value of the air-fuel ratio as the measured information and to provide a desired air-fuel ratio as the desired response information.

22. The system of claim 19, wherein the mechanism to determine includes:
a mechanism constructed and adapted to obtain the fuel trims information as the measured information and to provide desired fuel trims information as the desired response information.

23. The system of claim 19, wherein the mechanism to modify the pulse width includes:
a mechanism constructed and adapted to determine a closed-loop pulse width in response to the pulse width of the fuel injection signal when the control system type is closed-loop, the closed-loop pulse width, the alternative fuel supplied by the alternative fuel injector and the determination of the error criterion being performed in response to the closed-loop pulse width.

24. The system of claim 23, wherein the mechanism to determine the closed-loop pulse width includes a mechanism constructed and adapted to adjust the closed-loop pulse width based on speed density information of the fuel powered apparatus.

25. The system of claim 19, wherein the mechanism to modify the pulse width includes:
a mechanism constructed and adapted to determine an open-loop pulse width in response to the pulse width of the fuel injection signal when the control system type is open-loop, the open-loop pulse width, the alternative fuel supplied by the alternative fuel injector and the determination of the error criterion being performed in response to the open-loop pulse width.

26. The system of claim 25, wherein the mechanism to determine the open-loop pulse width includes a mechanism constructed and adapted to adjust the open-loop pulse width based on speed density information of the fuel powered apparatus.

27. A system for controlling fuel injection of an internal combustion engine of a vehicle, the system comprising:
  sensors applied to the vehicle for sensing parameters relating to the vehicle and the fuel injection;
  a controller for providing a fuel injection signal having a pulse width based on the sensed parameters;
  a fuel injector for injecting a first fuel in a first mode and a second fuel in a second mode into the engine;
  a comparator for comparing the sensed parameters with reference parameters to provide an error signal;
  a pulse width modifier for changing the pulse width in response to the error signal; and
  a switch for providing the fuel injection signal to the fuel injector and the pulse width modifier in the first and second modes, where:
    (i) in the first mode, the fuel injector injects the first fuel into the engine in response to the pulse width of the fuel injection signal,
    (ii) in the second mode, the fuel injector injects the second fuel into the engine in response to a modified pulse width of a modified fuel injection signal, the modified pulse width being one changed by the pulse width modifier, the parameters sensed by the sensors in the second mode being provided to the comparator, the comparator providing the error signal in comparing the sensed parameters to the reference parameters.

28. The system of claim 27, wherein the first fuel includes gasoline and the second fuel includes an alternative fuel, the first mode being a gasoline operation mode, the second mode being an alternative fuel operation mode.

29. The system of claim 28, wherein the fuel injector comprises first and second injectors, the first injector injecting the gasoline into the engine in the first mode and the second injector injecting the alternative fuel into the engine in the second mode.

30. The system of claim 28, wherein the controller includes means for determining the fuel injection signal in response to the sensed parameters in the first mode, the fuel injection signal having a gasoline pulse width for enabling operation of the engine on the gasoline.

31. The system of claim 30, wherein the controller includes means for determining the fuel injection signal in response to the sensed parameters in the second mode, the fuel injection signal having an alternative fuel pulse width for enabling operation of the engine on the alternative fuel.

32. The system of claim 31, wherein the pulse width modifier includes means for changing the gasoline pulse width of the fuel injection signal to the modified pulse width in response to parameters sensed during operation of engine on the alternative fuel.

33. The system of claim 32, wherein the alternative fuel includes a gaseous fuel.

34. The system of claim 33, wherein the gaseous fuel is one of propane and hydrogen.

35. The system of claim 33, wherein the gaseous fuel includes natural gas, the second mode being a natural gas operating mode, the fuel injector including first and second injectors for injecting the gasoline and the natural gas.

36. The system of claim 35, wherein the sensors include an exhaust gas oxygen (EGO) sensor for obtaining an EGO content and an engine temperature sensor for obtaining an engine temperature, wherein the sensed parameters are formulated from the EGO content and the engine temperature.

37. The system of claim 36, wherein the controller includes means for providing information on a closed-loop status of the controller.

38. The system of claim 37, wherein the pulse width modifier includes means for varying the pulse width in response to the EGO content, the engine temperature and the closed-loop status.

39. The system of claim 35, wherein the sensors include a universal exhaust gas oxygen (UEGO) sensor for obtaining air-fuel ratios wherein the sensed parameters are formulated from the air-fuel ratios.

40. The system of claim 39, wherein the controller includes means for providing information on a closed-loop status of the controller.

41. The system of claim 40, wherein the pulse width modifier includes means for varying the pulse width in response to the air-fuel ratios and the closed-loop status.

42. The system of claim 35, wherein the controller includes means for providing fuel trims in response to the sensed parameters.

43. The system of claim 42, wherein the sensors includes a universal exhaust gas oxygen UEGO sensor for obtaining air-fuel ratios.

44. The system of claim 43, wherein the controller includes means for providing information on a closed-loop status of the controller.

45. The system of claim 44, wherein the pulse width modifier includes means for varying the pulse width in response to the air-fuel ratios and the closed-loop status.

46. A vehicle having an internal combustion engine comprising first and second groups of fuel injectors, the first group of injectors being gasoline injectors, the second group of injectors being alternative fuel injectors; the vehicle comprising:
  sensing means for providing information on air for use in the engine, engine temperature, and exhaust gas oxygen content;
  control means for providing a fuel control signal having a pulse width in response to the information provided by the sensing means;
  means for selecting a path of the fuel control signal;
  first fuel injection means for controlling the gasoline injection by the gasoline injectors in response to the pulse width of the fuel control signal, while the path of the fuel control signal is selected to the first fuel injection means;
  pulse modification means for modifying the pulse width of the fuel control signal when the path of the fuel control signal is selected to the pulse modification means; and
  second fuel injection means for controlling the alternative fuel injection by the alternative fuel injectors in response to a modified pulse width of the fuel control signal.

47. The vehicle of claim 46, wherein the pulse modification means includes means for changing the pulse width of the fuel control signal in response to the information provided by the sensing means.

48. The vehicle of claim 47, wherein the sensing means includes means for sensing values of a manifold air pressure, an engine speed, a coolant temperature, and an intake temperature.

49. The vehicle of claim 46, further comprising means for providing information on fuel trims.

50. The vehicle of claim 49, wherein:

the sensing means includes means for sensing values of a manifold air pressure, an engine speed, a coolant temperature, and an intake temperature; and the pulse modification means including means for changing the pulse width of the fuel control signal in response to the sensed values and the fuel trim information.

51. The vehicle of claim 49, the pulse modification means further comprises:

means for comparing the sensed values and the fuel trim information to reference values and providing errors therebetween: and means for changing the pulse width of the fuel signal in response to the errors.

52. The vehicle of claim 46, further comprising means for providing gaseous fuel as the alternative fuel.

53. The vehicle of claim 52, wherein the alternative fuel is one of natural gas, propane and hydrogen.

54. A computer program product comprising a computer useable medium having computer logic stored therein for modifying a fuel injection signal having a pulse width, the fuel injection signal being provided by a controller managing a fuel powered apparatus receiving gasoline and an alternative fuel for electrical control of a gasoline operated injector and an alternative-fuel operated injector, the controller having information on temperature, exhaust gas oxygen (EGO) content, air-fuel ratio, fuel trims and a control system type, the computer program product including:

a mechanism constructed and adapted to obtain the pulse width of the fuel injection signal;

a mechanism constructed and adapted to receive the information on the temperature, EGO content and the fuel trims;

a mechanism constructed and adapted to modify the pulse width of the fuel injection signal based on the received information, the modified pulse width controlling the alternative fuel supplied by the alternative fuel injector to the fuel powered apparatus; and a mechanism constructed and adapted to determine whether an error criterion is met based on measured information of the fuel powered apparatus operating on the alternative fuel and desired response information.

55. The computer program product of claim 54, wherein the mechanism to determine includes:

a mechanism constructed and adapted to obtain a value of the EGO content as the measured information and to provide a desired EGO content as the desired response information.

56. The computer program product of claim 54, wherein the mechanism to determine includes:

a mechanism constructed and adapted to obtain a value of the air-fuel ratio as the measured information and to provide a desired air-fuel ratio as the desired response information.

57. The computer program product of claim 54, wherein the mechanism to determine includes:

a mechanism constructed and adapted to obtain the fuel trims information as the measured information and to provide desired fuel trims information as the desired response information.

58. The computer program product of claim 54, wherein the mechanism to modify the pulse width includes:

a mechanism constructed and adapted to determine a closed-loop pulse width in response to the pulse width of the fuel injection signal when the control system type is closed-loop, the closed-loop pulse width, the alternative fuel supplied by the alternative fuel injector and the determination of the error criterion being performed in response to the closed-loop pulse width.

59. The computer program product of claim 54, wherein the mechanism to determine the closed-loop pulse width includes a mechanism constructed and adapted to adjust the closed-loop pulse width based on speed density information of the fuel powered apparatus.

60. The computer program product of claim 54, wherein the mechanism to modify the pulse width includes:

a mechanism constructed and adapted to determine an open-loop pulse width in response to the pulse width of the fuel injection signal when the control system type is open-loop, the open-loop pulse width, the alternative fuel supplied by the alternative fuel injector and the determination of the error criterion being performed in response to the open-loop pulse width.

61. The computer program product of claim 54, wherein the mechanism to determine the open-loop pulse width includes a mechanism constructed and adapted to adjust the open-loop pulse width based on speed density information of the fuel powered apparatus.

62. Computer-readable media tangibly embodying a program of instructions executable by a computer to perform a method of modifying a fuel injection signal having a pulse width, the fuel injection signal being provided by a controller managing a fuel powered apparatus receiving gasoline and an alternative fuel for electrical control of a gasoline operated injector and an alternative-fuel operated injector, the controller having information on temperature, exhaust gas oxygen (EGO) content, air-fuel ratio and fuel trims, the method comprising:

(a) receiving the pulse width of the fuel injection signal;

(b) receiving the information on the temperature, EGO content, and the fuel trims;

(c) modifying the pulse width of the fuel injection signal based on the received information, the modified pulse width controlling the alternative fuel supplied by the alternative fuel injector to the fuel powered apparatus;

(d) determining whether an error criterion is met based on measured information of the fuel powered apparatus operating on the alternative fuel and desired response information; and (e) repeating the steps (c) and (d) when the error criterion is not met.

63. In a vehicle controller, in which a fuel injection signal having a pulse width is modified, the fuel injection signal being provided by the vehicle controller managing a fuel powered apparatus receiving gasoline and an alternative fuel for electrical control of a gasoline operated injector and an alternative-fuel operated injector, the controller having information on temperature, exhaust gas oxygen (EGO) content, air-fuel ratio and fuel trims, a memory medium comprising software programmed to provide the modified fuel injection signal by a method comprising:

(a) receiving the pulse width of the fuel injection signal;

(b) receiving the information on the temperature, EGO content, and the fuel trims;

(c) modifying the pulse width of the fuel injection signal based on the received information, the modified pulse width controlling the alternative fuel supplied by the alternative fuel injector to the fuel powered apparatus;

(d) determining whether an error criterion is met based on measured information of the fuel powered apparatus operating on the alternative fuel and desired response information; and (e) repeating the steps (c) and (d) when the error criterion is not met.

* * * * *